(12) United States Patent
Ranieri et al.

(10) Patent No.: US 12,548,784 B2
(45) Date of Patent: Feb. 10, 2026

(54) RAISED FEED CHANNELS TO MAINTAIN PLANAR BIPOLAR PLATE ALIGNMENT

(71) Applicant: HYDROGENICS CORPORATION, Mississauga (CA)

(72) Inventors: Salvatore Ranieri, Etobicoke (CA); Nathaniel Ian Joos, Toronto (CA); Rainey Yu Wang, Richmond Hill (CA); Thomas Anthony Link, Brampton (CA)

(73) Assignee: HYDROGENICS CORPORATION, Mississauga (CA)

( * ) Notice: Subject to any disclaimer, the term of this patent is extended or adjusted under 35 U.S.C. 154(b) by 539 days.

(21) Appl. No.: 18/189,624

(22) Filed: Mar. 24, 2023

(65) Prior Publication Data

US 2023/0327143 A1    Oct. 12, 2023

Related U.S. Application Data

(60) Provisional application No. 63/328,146, filed on Apr. 6, 2022.

(51) Int. Cl.
| | |
|---|---|
| *H01M 8/0258* | (2016.01) |
| *H01M 8/0271* | (2016.01) |
| *H01M 8/10* | (2016.01) |
| *H01M 8/1004* | (2016.01) |

(52) U.S. Cl.
CPC ....... *H01M 8/0258* (2013.01); *H01M 8/0271* (2013.01); *H01M 8/1004* (2013.01); *H01M 2008/1095* (2013.01)

(58) Field of Classification Search
CPC . H01M 8/0258; H01M 8/0271; H01M 8/1004
See application file for complete search history.

(56) References Cited

U.S. PATENT DOCUMENTS

| | | | |
|---|---|---|---|
| 9,178,224 | B2 | 11/2015 | Goebel et al. |
| 9,847,536 | B2 | 12/2017 | Freese |
| 11,114,678 | B2 | 9/2021 | Bach et al. |
| 2002/0119358 | A1 | 8/2002 | Rock |
| 2014/0272661 | A1 | 9/2014 | Goebel et al. |
| 2015/0228987 | A1 | 8/2015 | Andreas-Schott et al. |
| 2019/0393518 | A1 | 12/2019 | Bach et al. |

FOREIGN PATENT DOCUMENTS

| | | |
|---|---|---|
| CN | 108123150 | 6/2018 |
| DE | 102012020947 | 4/2014 |
| JP | 2007026908 | 2/2007 |
| KR | 100537726 | 12/2005 |

*Primary Examiner* — Sarah A. Slifka
(74) *Attorney, Agent, or Firm* — Barnes & Thornburg LLP

(57) ABSTRACT

A fuel cell assembly includes a first bipolar plate, a second bipolar plate, and a diffusion-electrode assembly. A first top surface of the first plate includes a first seal protruding upwardly and a first raised feed channel adjacent the first seal and protruding upwardly. A second bottom surface of the second plate includes a second seal protruding downwardly and a second raised feed channel adjacent the second seal and protruding downwardly. The diffusion-electrode assembly includes a membrane layer having a membrane frame extending therefrom and two gas diffusion layers. The first and second plates are arranged parallel, the first and second seals align with each other, and the first and second raised feed channels align with each other. The first and second raised feed channels contact the membrane frame arranged therebetween so as to prevent mechanical deformations of the first and second plates.

20 Claims, 12 Drawing Sheets

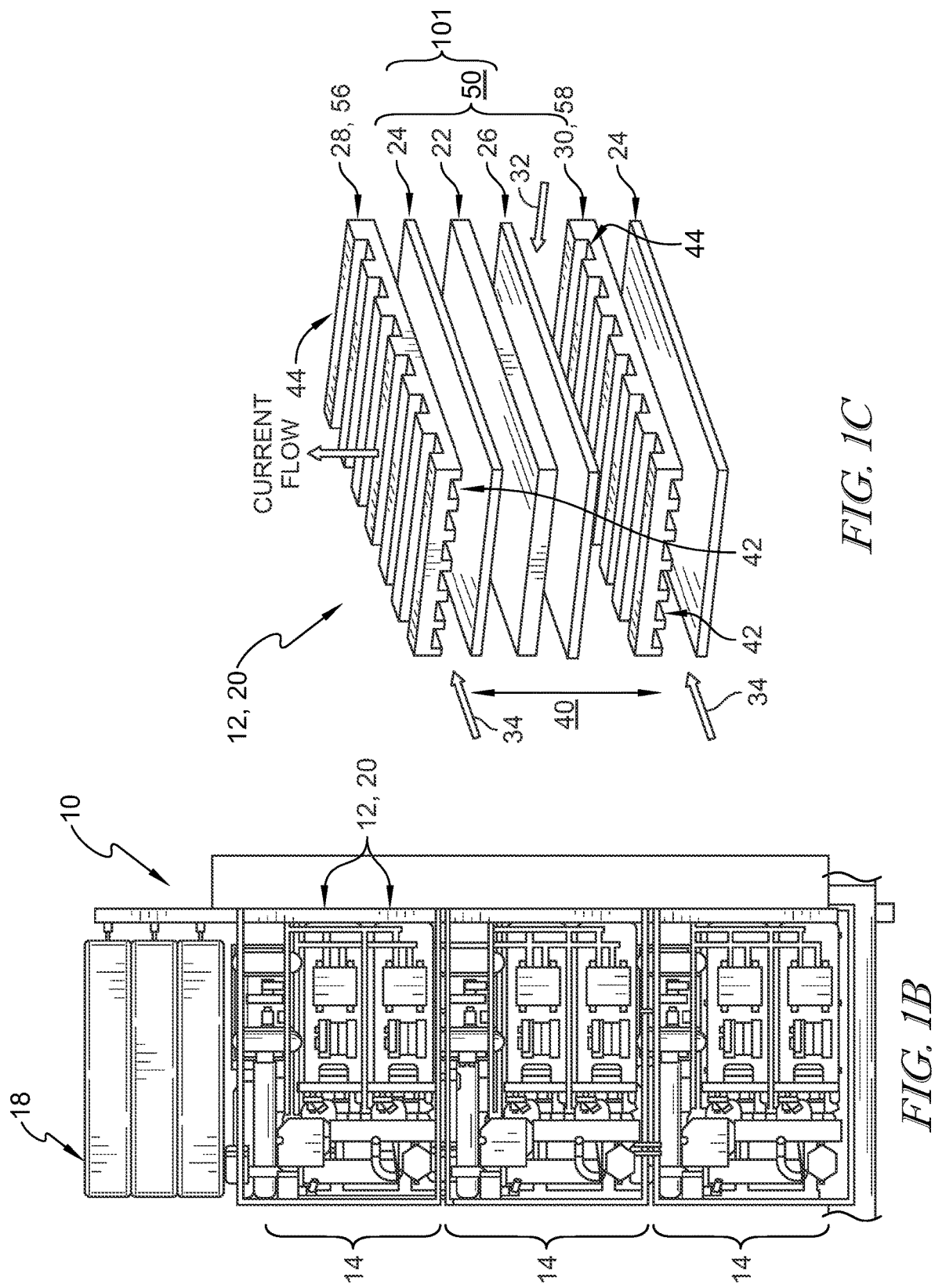

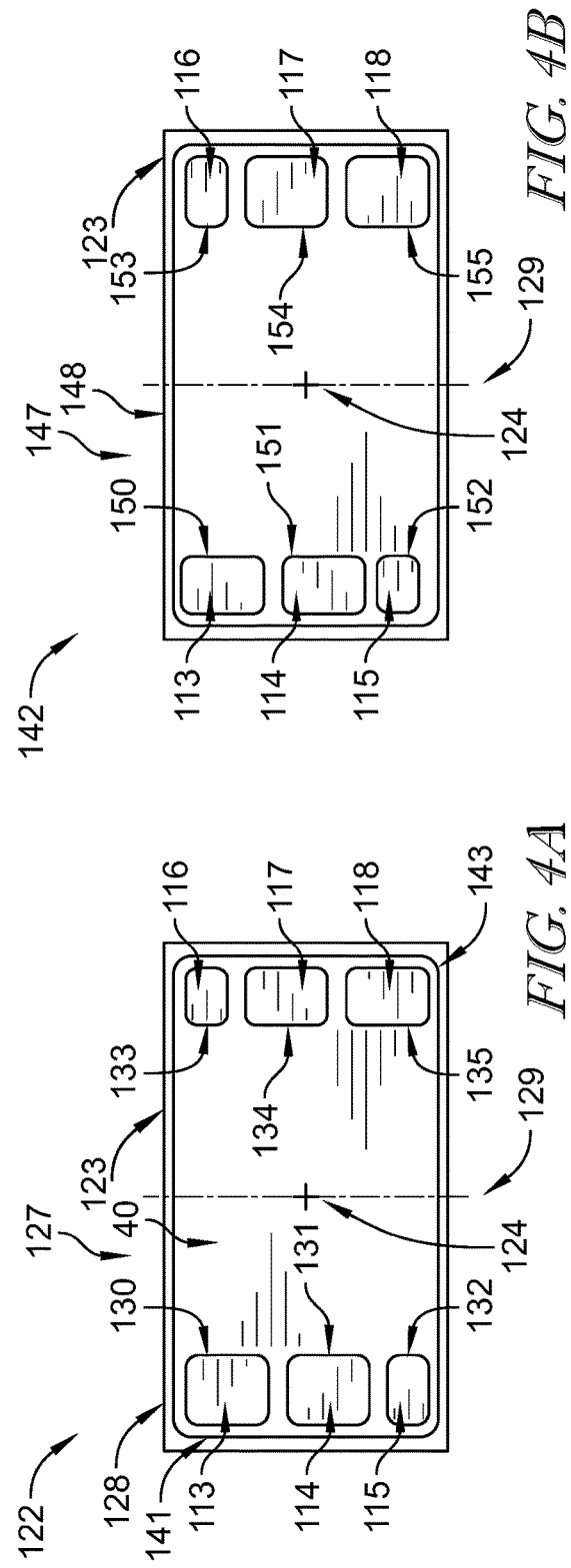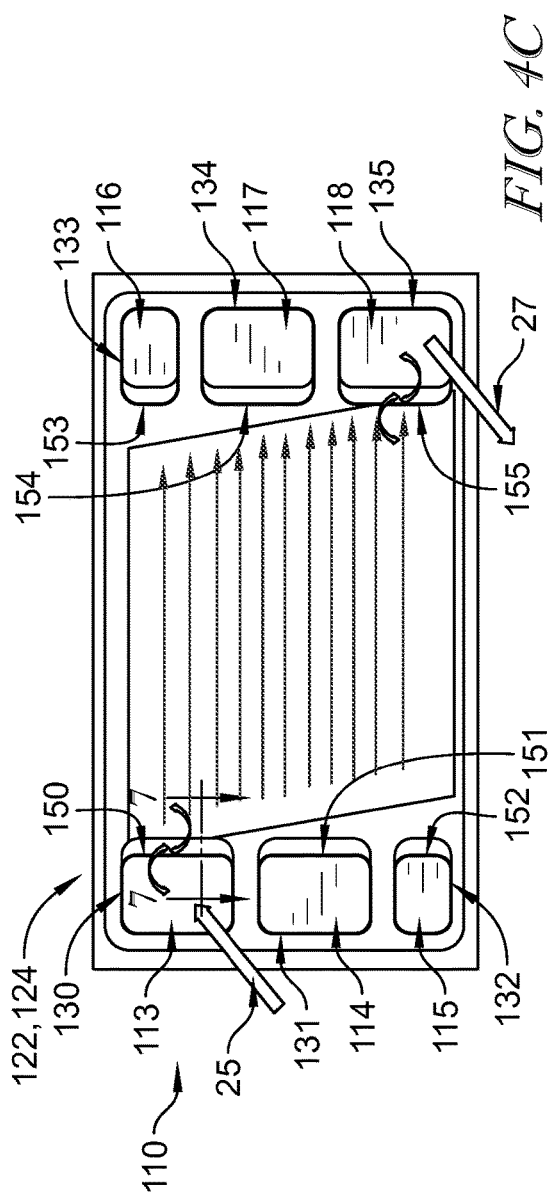
*FIG. 4A*
*FIG. 4B*
*FIG. 4C*

RAISED FEED CHANNELS TO MAINTAIN PLANAR BIPOLAR PLATE ALIGNMENT

CROSS-REFERENCE TO RELATED APPLICATIONS

This non-provisional application claims the benefit and priority, under 35 U.S.C. § 119(e) and any other applicable laws or statutes, to U.S. Provisional Patent Application Ser. No. 63/328,146 filed Apr. 6, 2022, the entire disclosure of which is hereby expressly incorporated herein by reference.

TECHNICAL FIELD

The present disclosure generally relates to components and methods for maintaining a unit cell planar alignment during a stack assembly and/or reducing the number of components required for a robust cell-stack assembly.

BACKGROUND

A single fuel cell is one of many repeating units of a fuel cell stack that may provide power or energy for personal and/or industrial use. A typical proton exchange membrane (PEM) fuel cell is comprised of many fuel cell assemblies compressed and bound into a fuel cell stack. A PEM fuel cell is a multi-component assembly that often comprises a membrane electrode assembly (MEA) at the center, a gas diffusion layer (GDL) on either side of the membrane electrode assembly (MEA), and a bipolar plate (BPP) on either side of each gas diffusion layer (GDL). The membrane electrode assembly (MEA) is the component that enables electrochemical reactions in the fuel cell and/or fuel cell stack. Typically, the fuel cell and/or fuel cell stack is assembled with the aforementioned components to operate in a useful and reliable manner.

In most mobility applications, reactants supplied to the fuel cell are pure hydrogen for an anode and an oxidant for a cathode. In the cathode, nitrogen often accompanies oxygen as the supply is from atmospheric air to avoid onboard storage. The anode is typically supplied with pure hydrogen from highly compressed gaseous or liquefied hydrogen stored in onboard tanks. A cooling system is often required to provide a heat sink to manage excess heat produced during the electrochemical reactions and to keep the fuel cell at an appropriate temperature during operation.

The fuel cell stacks have common aligned features that allow for a single supply path and return path for each of the anode fluids, cathode fluids, and coolant fluids. These aligned features create a stack-long cavity for the product and reactant fluid to flow, to simultaneously facilitate the supply, and return of the process streams from all the fuel cells in a parallel flow configuration. Since the cells share a common supply and return cavity or manifold, a near equal amount of the reactants and the coolant fluid is diverted to each individual cell and through their respective isolated pathway(s). Such channels or pathways that travel over the length of the bipolar plate (BPP) are referred to as flow field(s).

The flow field consists of millimeter scale channel networks that direct the bulk supply of reactants from the manifolds, and distribute and diffuse the reactants over an active area of the fuel cells. The active area of the fuel cell is the main portion of the fuel cell where both the anode and cathode flow fields directly overlap. The open-faced channel of the anode and cathode flow fields are exposed directly overtop the gas diffusion layer (GDL) and the membrane electrode assembly (MEA). Reactant molecules present in the active area of the membrane electrode assembly (MEA) may produce a voltage potential across the cells and a current draw, or a load, may be supported by the reactant flow rate. As the current demand on the fuel cell increases, the molar flow of the reactants is required to increase proportionally.

Adjacent bipolar plates (BPP) house the membrane electrode assembly (MEA) and the gas diffusion layer (GDL) such that overall alignment is maintained. Alignment is important to ensure cell-to-cell features such as manifolds and active areas, as well as external interfacing devices, such as a stack enclosure or CVM clips, are compatible with the stack assembly. Lateral deviation of the cells can cause several operational or manufacturing issues such as premature failure of seals, nonconformance of interfacing parts, and/or troublesome integration.

The bipolar plates (BPP) must also be designed in a way that retains a near perfect planar or parallelism between the cells. This is also important for robust assembly and operation of the stack for several reasons. Firstly, the soft goods must be evenly compressed to maintain sufficient electrical contact throughout the active area. Any non-uniformities in compression can cause excessive resistivity within the cells which in turn will cause losses in performance and excess heat generation. Secondly, the bipolar plates (BPP) must be symmetrically compressed to avoid any excessive local stress, which can result in local bending and/or fracture of the plates. Bending is more often associated with a poorly designed metallic bipolar plate (BPP) while fracture is a likely failure if a graphite bipolar plate (BPP) is poorly designed.

Accordingly, it would be advantageous to provide a fuel cell assembly having precise alignment of cell-to-cell features as well as providing near perfect planar or parallelism between the cells.

SUMMARY

Embodiments of the present invention are included to meet these and other needs.

In one aspect, described herein, a fuel cell assembly comprises a first bipolar plate, a second bipolar plate, and a diffusion-electrode assembly. The first bipolar plate includes a first upper side and a first lower side. The first upper side defines a first top surface and includes a first seal protruding upwardly away from the first top surface and at least one first raised feed channel formed adjacent to the first seal and protruding upwardly away from the first top surface.

Fluid enters the first raised feed channel and subsequently flows along first channels formed in the first bipolar plate. The second bipolar plate includes a second upper side and a second lower side. The second lower side defines a second bottom surface and includes a second seal protruding downwardly away from the second bottom surface and at least one second raised feed channel formed adjacent to the second seal and protruding downwardly away from the second bottom surface. Fluid enters the second raised feed channel and subsequently flows along second channels formed in the second bipolar plate.

The diffusion-electrode assembly is arranged between the first bipolar plate and the second bipolar plate. The diffusion-electrode assembly is in spaced apart relation to the first and second seals and the first and second raised feed channels. The diffusion-electrode assembly includes a membrane electrode layer arranged between a first gas diffusion layer and a second gas diffusion layer each configured to engage with the fluids, respectively. The membrane electrode layer includes an electrode body and a membrane frame extending away from the electrode body, between the first and second seals and between the first and second raised feed channels.

The first bipolar plate and the second bipolar plate are arranged parallel with each other and are aligned such that the first seal and the second seal align with each other, and such that the first raised feed channel and the second raised feed channel align with each other. The first raised feed channel and the second raised feed channel contact the membrane frame arranged therebetween so as to prevent mechanical deformations of the first and second bipolar plate.

In some embodiments, the first lower side of the first bipolar plate may define a first lower surface and may include a third seal protruding downwardly away from the first lower surface. In some embodiments, the third seal may be in spaced apart relation to the first seal and the first raised feed channel such that the first raised feed channel may be located between the first seal and the third seal in a longitudinal direction of the first bipolar plate. In some embodiments, the contact between the first raised feed channel, the second raised feed channel, and the membrane frame may prevent mechanical deformations of the first and second bipolar plates in response to the third seal being acted on by a first external force.

In some embodiments, the second upper side of the second bipolar plate may define a second top surface and may include a fourth seal protruding upwardly away from the second top surface. In some embodiments, the fourth seal may be in spaced apart relation to the second seal and the second raised feed channel such that the second raised feed channel may be located between the second seal and the fourth seal in a longitudinal direction of the second bipolar plate. In some embodiments, the contact between the first raised feed channel, the second raised feed channel, and the membrane frame may prevent mechanical deformations of the first and second bipolar plates in response to the fourth seal being acted on by a second external force.

In some embodiments, the first external force may be generated by a third bipolar plate arranged below and compressing the first bipolar plate via a fifth seal of the third bipolar plate. In some embodiments, the fifth seal may be aligned with and compressing the third seal of the first bipolar plate.

In some embodiments, the second external force may be generated by a fourth bipolar plate arranged above and compressing the second bipolar plate via a sixth seal of the fourth bipolar plate. In some embodiments, the sixth seal may be aligned with and compressing the fourth seal of the second bipolar plate.

In some embodiments, the first bipolar plate may be a rectangular plate that is generally planar. In some embodiments, the first bipolar plate may further include a first inlet header portion located adjacent a first corner of the plate, a first outlet header portion located adjacent a second corner of the plate diagonally opposing the first corner, a first active portion located longitudinally between the first inlet header portion and the first outlet header portion on which the first channels are arranged.

In some embodiments, the first channels may include a plurality of cathode channels adjacent to the first gas diffusion layer such that fluid flowing through the cathode channels interacts with the first gas diffusion layer. In some embodiments, the first seal and the first raised feed channel may be located within the first inlet header portion of the first bipolar plate such that fluid flows from the first raised feed channel to the plurality of cathode channels and exits via the first outlet header portion.

In some embodiments, the second bipolar plate may be a rectangular plate that is generally planar. In some embodiments, the second bipolar plate may further include a second inlet header portion located adjacent a first corner of the plate, a second outlet header portion located adjacent a second corner of the plate diagonally opposing the first corner, a second active portion located longitudinally between the second inlet header portion and the second outlet header portion on which the second channels are arranged.

In some embodiments, the second channels may include a plurality of anode channels adjacent to the second gas diffusion layer such that fluid flowing through the anode channels interacts with the second gas diffusion layer. In some embodiments, the second seal and the second raised feed channel may be located within the second inlet header portion of the second bipolar plate such that fluid flows from the second raised feed channel to the plurality of anode channels and exits via the second outlet header portion.

In some embodiments, the first raised feed channel, the plurality of cathode channels, and at least one first outlet channel located in the first outlet header portion may be in fluidic communication so as to form a first fluid path of the first bipolar plate. In some embodiments, a first central axis that extends transversely across the plate and that is perpendicular to longitudinal edges of the plate may divide the first bipolar plate into a first half portion and a second half portion having equal areas. In some embodiments, the first fluid path may be rotationally symmetrical relative to the first central axis.

In some embodiments, the second raised feed channel, the plurality of anode channels, and at least one second outlet channel located in the second outlet header portion may be in fluidic communication so as to form a second fluid path of the second bipolar plate. In some embodiments, a second central axis that extends transversely across the plate and that is perpendicular to longitudinal edges of the plate may divide the second bipolar plate into a first half portion and a second half portion having equal areas. In some embodiments, the second fluid path may be rotationally symmetrical relative to the second central axis.

In some embodiments, the plurality of cathode channels may be formed between adjacent elongated cathode channel protrusions that protrude away from the first bipolar plate in a first direction opposite a second direction in which the first raised feed channel protrudes. In some embodiments, the plurality of anode channels may be formed between adjacent elongated anode channel protrusions that protrude away from the second bipolar plate in a first direction opposite a second direction in which the second raised feed channel protrudes.

In some embodiments, the elongated cathode channel protrusions may protrude away from the first bipolar plate a first distance. In some embodiments, the elongated anode channel protrusions may protrude away from the second bipolar plate a second distance. In some embodiments, the first distance is may be greater than the second distance.

In some embodiments, a third distance that the first and second raised feed channels protrude away from the first and second bipolar plates may be an average of the first distance and the second distance.

According to a second aspect, described herein, a fuel cell assembly comprises a plurality of bipolar plates and a diffusion-electrode assembly. The plurality of bipolar plates are generally rectangular and planar, stacked relative to each other, and each include at least one seal arranged on an inlet of the bipolar plate. The at least one seal is in contact with at least one seal of an adjacent bipolar plate.

The diffusion-electrode assembly includes a membrane electrode and two gas diffusion layers surrounding the membrane electrode. The diffusion-electrode assembly is arranged between adjacent bipolar plates of the plurality of bipolar plate. The membrane electrode includes an electrode body and a membrane frame extending away from the electrode body. Each bipolar plate of the plurality of bipolar plates further includes a raised feed channel spaced apart from at least one seal of the at least one seal and adjacent to the inlet. The raised feed channel protrudes away from the bipolar plate in a direction that the at least one seal protrudes away from the bipolar plate.

Fluid enters the raised feed channel and subsequently flows along channels formed in the bipolar plate in order to engage with one of the two gas diffusion layers. The plurality of bipolar plates are stacked such that the membrane frame is located between adjacent raised feed channels and such that each of the raised feed channels contacts the membrane frame so as to prevent mechanical deformations of the plurality of bipolar plates.

In some embodiments, the at least one seal of each bipolar plate of the plurality of bipolar plates may include an outer seal and an inner seal. In some embodiments, the outer and inner seals may be spaced apart from each other in a longitudinal direction of the plate. In some embodiments, the raised feed channel may be located between the outer and inner seals.

In some embodiments, the stacked bipolar plates may alternate between first bipolar plates and second bipolar plates. In some embodiments, the outer seal of each first bipolar plate may protrude upwardly away from the bipolar plate. In some embodiments, the inner seal and raised feed channel of each first bipolar plate may protrude downwardly away from the bipolar plate.

In some embodiments, the outer seal of each second bipolar plate may protrude downwardly away from the bipolar plate. In some embodiments, the inner seal and raised feed channel of each second bipolar plate may protrude upwardly away from the bipolar plate. In some embodiments, the outer seals, the inner seals, and the raised feed channels of adjacent first and second bipolar plates may be each aligned with each other.

In some embodiments, each bipolar plate may include a central active region having elongated channel protrusions that define channels therebetween. In some embodiments, the elongated channel protrusions of the first bipolar plates may protrude away from the first bipolar plate a first distance.

In some embodiments, the elongated channel protrusions of the second bipolar plate may protrude away from the second bipolar plate a second distance. In some embodiments, the first distance may be greater than the second distance. In some embodiments, a third distance that the raised feed channels may protrude away from the first and second bipolar plates may be an average of the first distance and the second distance.

According to a third aspect, described herein, a method of forming a fuel cell comprises providing a plurality of bipolar plates that are generally rectangular and planar. Each bipolar plate includes (i) a first outer seal protruding downwardly away from the plate, a first inner seal protruding upwardly away from the plate, and a first raised feed channel protruding upwardly away from the plate, the first outer seal, the first inner seal, and the first raised feed channel arranged on an inlet of the bipolar plate, and (ii) a second inner seal protruding downwardly away from the plate, a second outer seal protruding upwardly away from the plate, and a second raised feed channel protruding downwardly away from the plate. The second outer seal, the second inner seal, and the second raised feed channel are arranged on an outlet of the bipolar plate. The inlet is located in a first corner of the plate and the outlet is located in a second corner of the plate diagonally opposite of the first corner.

The method further includes providing at least one diffusion-electrode assembly including a membrane electrode and two gas diffusion layers surrounding the membrane electrode. The membrane electrode including an electrode body and a membrane frame extending away from the electrode body.

The method further includes arranging a first bipolar plate of the plurality of bipolar plates in a first position. The method further includes arranging a first diffusion-electrode assembly of the at least one diffusion-electrode assembly above the first bipolar plate such that one of the two gas diffusion layers is engaged with the first bipolar plate. The method further includes arranging a second bipolar plate of the plurality of bipolar plates above the first diffusion-electrode assembly such that the other of the two gas diffusion layers is engaged with the second bipolar plate, wherein the second bipolar plate is arranged on the first diffusion-electrode assembly rotated 180 degrees clockwise or counterclockwise relative to the first bipolar plate about a central axis that extends through a central point of the rectangular plate and that is perpendicular to the plate such that the second outer seal, the second inner seal, and the second raised feed channel of the second bipolar plate are aligned with the first outer seal, the first inner seal, and the first raised feed channel of the first bipolar plate, respectively. The membrane frame is located between the first and the second raised feed channels such that the first and the second raised feed channels contact the membrane frame so as to prevent mechanical deformations of the first and second bipolar plate.

In some embodiments, the method may further comprise arranging an additional bipolar plate and an additional diffusion-electrode assembly above or below one of the first and second bipolar plates, wherein the additional bipolar plate may be rotated 180 degrees relative to the one of the first and second bipolar plates such that the second outer seal, the second inner seal, and the second raised feed channel of the additional bipolar plate may be aligned with the first outer seal, the first inner seal, and the first raised feed channel of the one of the first and second bipolar plates, respectively.

In some embodiments, the first outer seal and the first inner seal may be spaced apart from each other in a longitudinal direction of the plate. In some embodiments, the first raised feed channel may be located between the first outer seal and the first inner seal. In some embodiments, the second outer seal and the second inner seal may be spaced apart from each other in a longitudinal direction of the plate. In some embodiments, the second raised feed channel may be located between the second outer seal and the second inner seal.

BRIEF DESCRIPTION OF DRAWINGS

The detailed description particularly refers to the following figures in which:

FIG. 1B is a cutaway view of an exemplary fuel cell system including an air delivery system, hydrogen delivery systems, and a plurality of fuel cell modules each including multiple fuel cell stacks;

FIG. 1C is a perspective view of an exemplary repeating unit of a fuel cell stack of the fuel cell system of FIG. 1A;

FIG. 4A is a top view of the bipolar plate of FIG. 3, showing a top side of the bipolar plate;

FIG. 4B is a top view of the bipolar plate of FIG. 4A, showing a bottom side of the bipolar plate;

FIG. 4C is a top view of the bipolar plate of FIG. 4A, showing both the top side and the bottom side of the bipolar plate;

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

Further, the present disclosure provides some illustrations and descriptions that include prototypes, bench models, and/or schematic illustrations of set-ups. A person skilled in the art will recognize how to rely upon the present disclosure to integrate the techniques, systems, devices, and methods provided for herein into a product and/or a system provided to customers, such customers including but not limited to individuals in the public or a company that will utilize the same within manufacturing facilities or the like. To the extent features are described as being disposed on top of, below, next to, etc. such descriptions are typically provided for convenience of description, and a person skilled in the art will recognize that, unless stated or understood otherwise, other locations and positions are possible without departing from the spirit of the present disclosure.

Unless otherwise defined, all technical terms used herein have the same meaning as commonly understood by one of ordinary skill in the art to which this disclosure belongs. Additionally, like-numbered components across embodiments generally have similar features unless otherwise stated or a person skilled in the art will appreciate differences based on the present disclosure and his/her knowledge. Accordingly, aspects and features of every embodiment may not be described with respect to each embodiment, but those aspects and features are applicable to the various embodiments unless statements or understandings are to the contrary.

The present disclosure is directed to systems, assemblies, and methods used to optimize alignment of cell-to-cell features of bipolar plates 28, 30, gas diffusion layers 24, 26, and membrane electrode assemblies 22 of a fuel cell assembly. In addition, the present disclosure is related to systems, assemblies, and methods to provide optimized planar and/or parallelism between fuel cells 20.

Figure 1A:
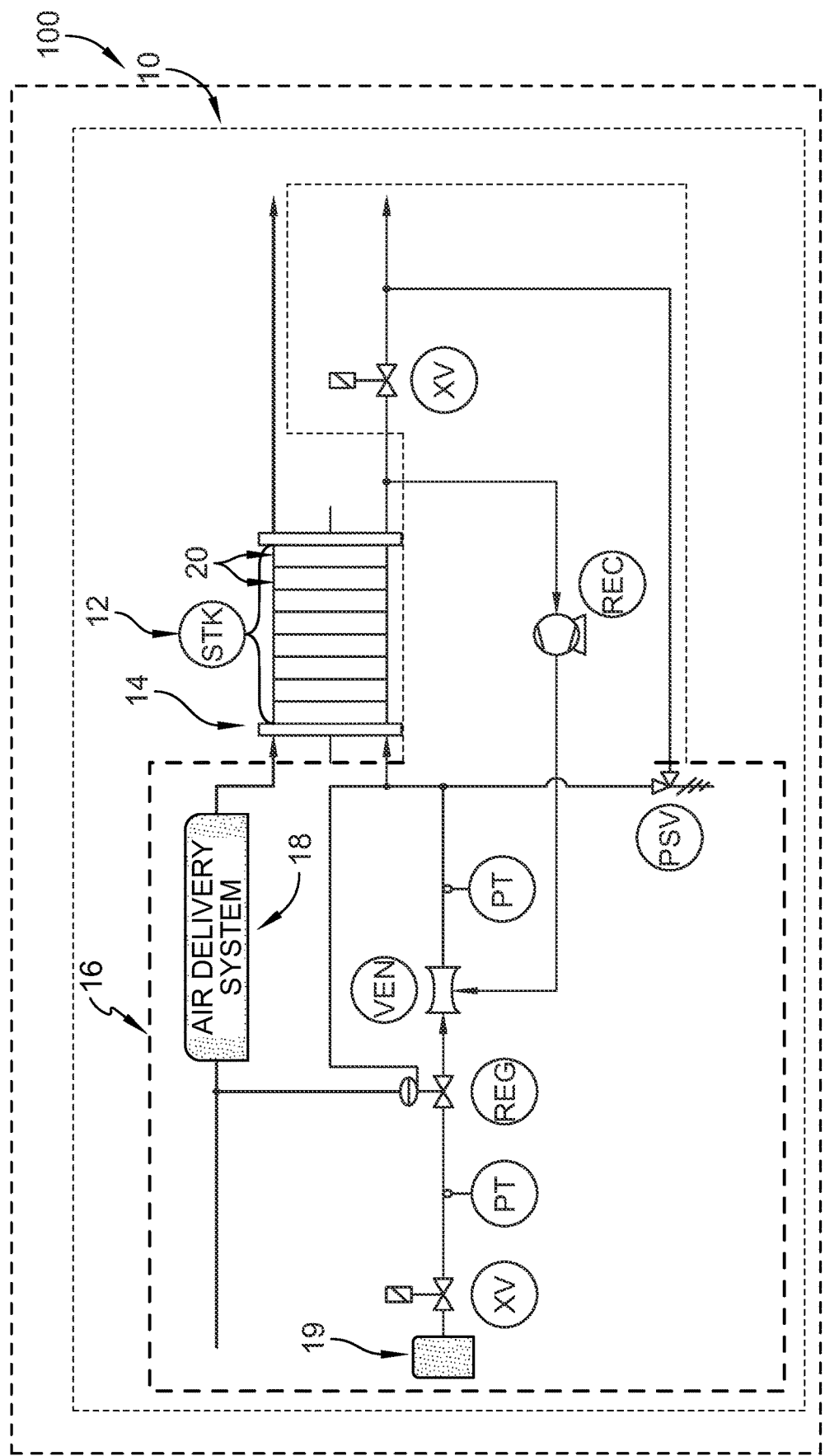
FIG. 1A is a schematic view of an exemplary fuel cell system including an air delivery system, a hydrogen delivery system, and a fuel cell module including a stack of multiple fuel cells.

As shown in FIG. 1A, fuel cell systems 10 often include one or more fuel cell stacks 12 or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
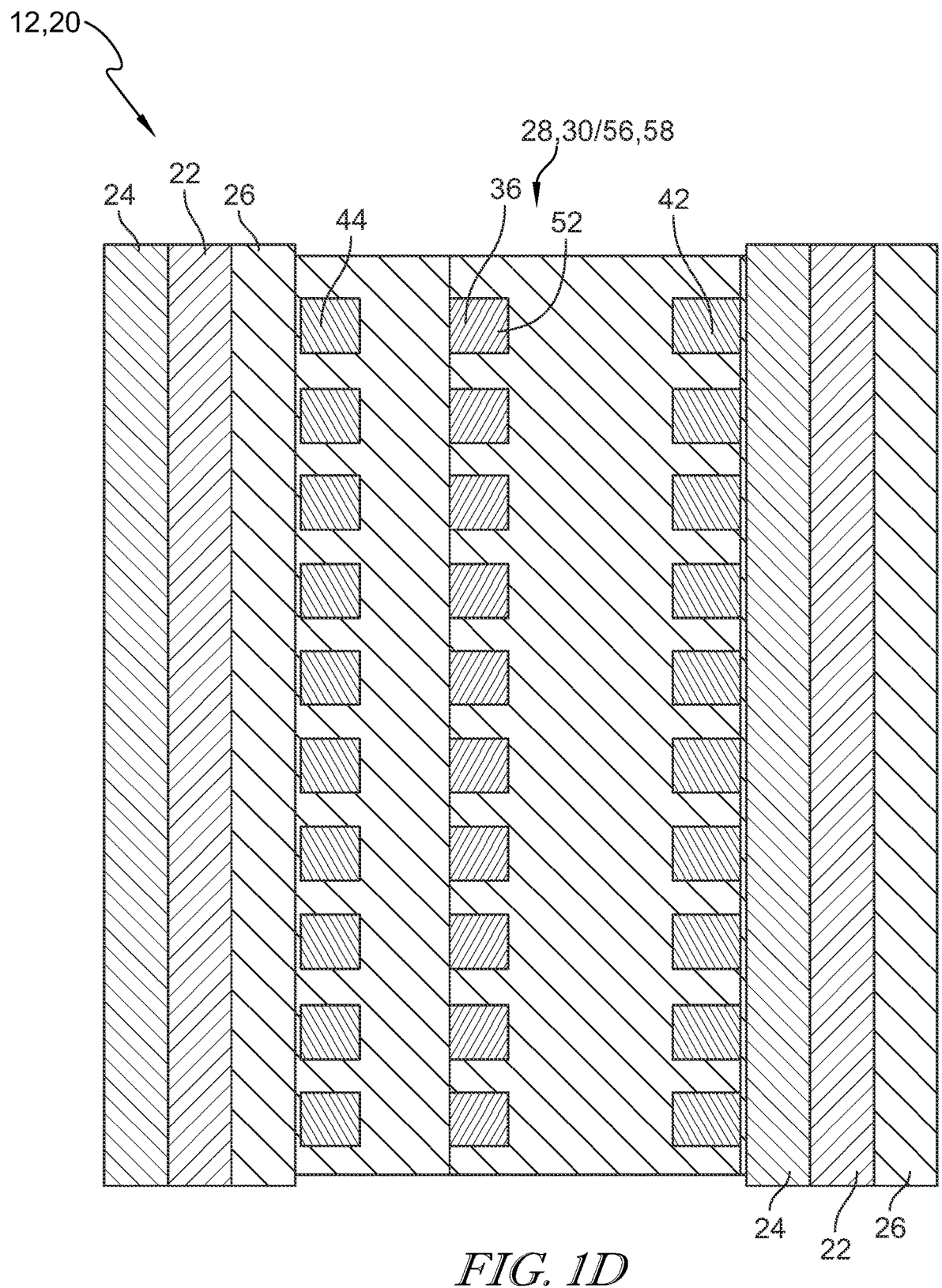
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24. As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power systems, such as industrial applications and power generation plants. The fuel cell system 10 may also be implemented in conjunction with an air delivery system 18. Additionally, the fuel cell system 10 may also be implemented in conjunction with a hydrogen delivery system and/or a source of hydrogen 19 such as a pressurized tank, including a gaseous pressurized tank, cryogenic liquid storage tank, chemical storage, physical storage, stationary storage, an electrolysis system or an electrolyzer. In one embodiment, the fuel cell system 10 is connected and/or attached in series or parallel to a hydrogen delivery system and/or a source of hydrogen 19, such as one or more hydrogen delivery systems and/or sources of hydrogen 19 in the BOP 16 (see FIG. 1A). In another embodiment, the fuel cell system 10 is not connected and/or attached in series or parallel to a hydrogen delivery system and/or a source of hydrogen 19.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system (e.g., an electrolyzer), an electrolyzer stack, and/or an electrolyzer cell (EC), respectively. As such, in some embodiments, the features and aspects described and taught in the present disclosure regarding the fuel cell system 10, stack 12, or cell 20 also relate to an electrolyzer, an electrolyzer stack, and/or an electrolyzer cell (EC). For example, in some embodiments, the features and attributes described herein as related to the fuel cell bipolar plates (BPP) 28, 30 may also relate to and/or be incorporated by one or more electrolyzer plates 56, 58. In further embodiments, the features and aspects described or taught in the present disclosure do not relate, and are therefore distinguishable from, those of an electrolyzer, an electrolyzer stack, and/or an electrolyzer cell (EC).

According to a first aspect of the present disclosure, the single repeating unit 50 of the fuel cell 20, such as a proton exchange membrane (PEM) fuel cell 20, is shown in FIG.

1C. The fuel cell 20 includes the single membrane electrode assembly (MEA) 22. The fuel cell 20 also includes one or more gas diffusion layers (GDL) 24, 26 on either or both sides of the membrane electrode assembly 22. The membrane electrode assembly 22 (which is typically regarded as a five-layer assembly) and the gas diffusion layers 24, 26 together form a seven-layer assembly 101, and also can be called the diffusion-electrode assembly 101. In the illustrative embodiment, the fuel cell 20 includes an anode gas diffusion layer 24 on one side of the membrane electrode assembly 22 and a cathode gas diffusion layer 26 on the other side of the membrane electrode assembly 22. The fuel cell 20 further includes bipolar plates (BPP) 28, 30 on the exterior and/or external side of each gas diffusion layer 24, 26.

A cross-sectional area of the fuel cell 20 and/or fuel cell stack 12 may determine the current operating range of the fuel cell 20 and/or fuel cell stack 12. In some embodiments, the product of the number of fuel cells 20 comprised in a fuel cell stack 12 and the area of each fuel cell 20 may indicate an overall power rating of the fuel cell stack 12. The membrane electrode assembly 22 and the gas diffusion layer 24, 26 may also impact the power rating and durability of the fuel cell stack 12.

Figure 2:
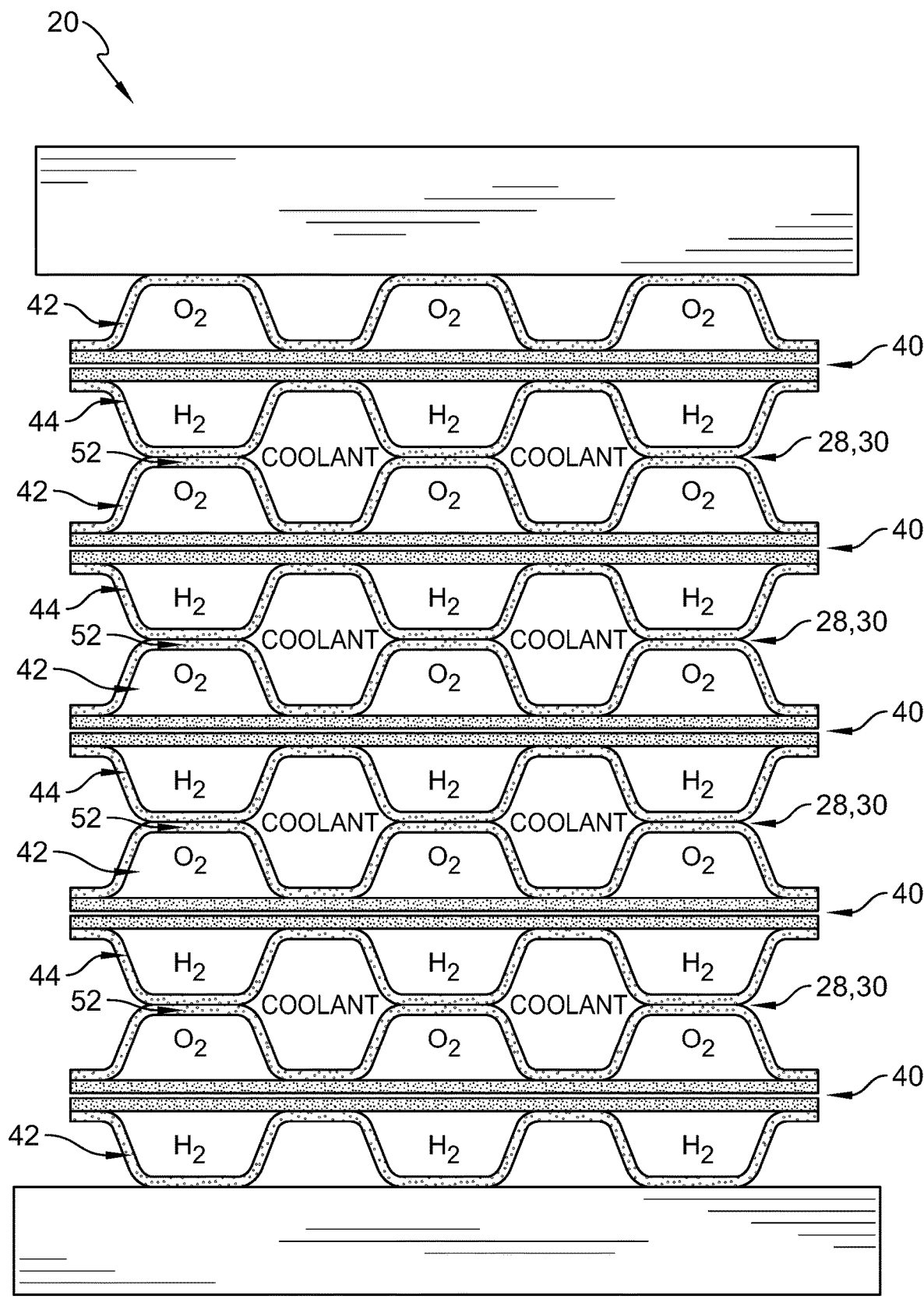
FIG. 2 is a schematic cross-section view within an active area of the fuel cell stack of FIG. 1C, showing anode, cathode and coolant channels within flow fields in the fuel cell stack.
Figure 3:
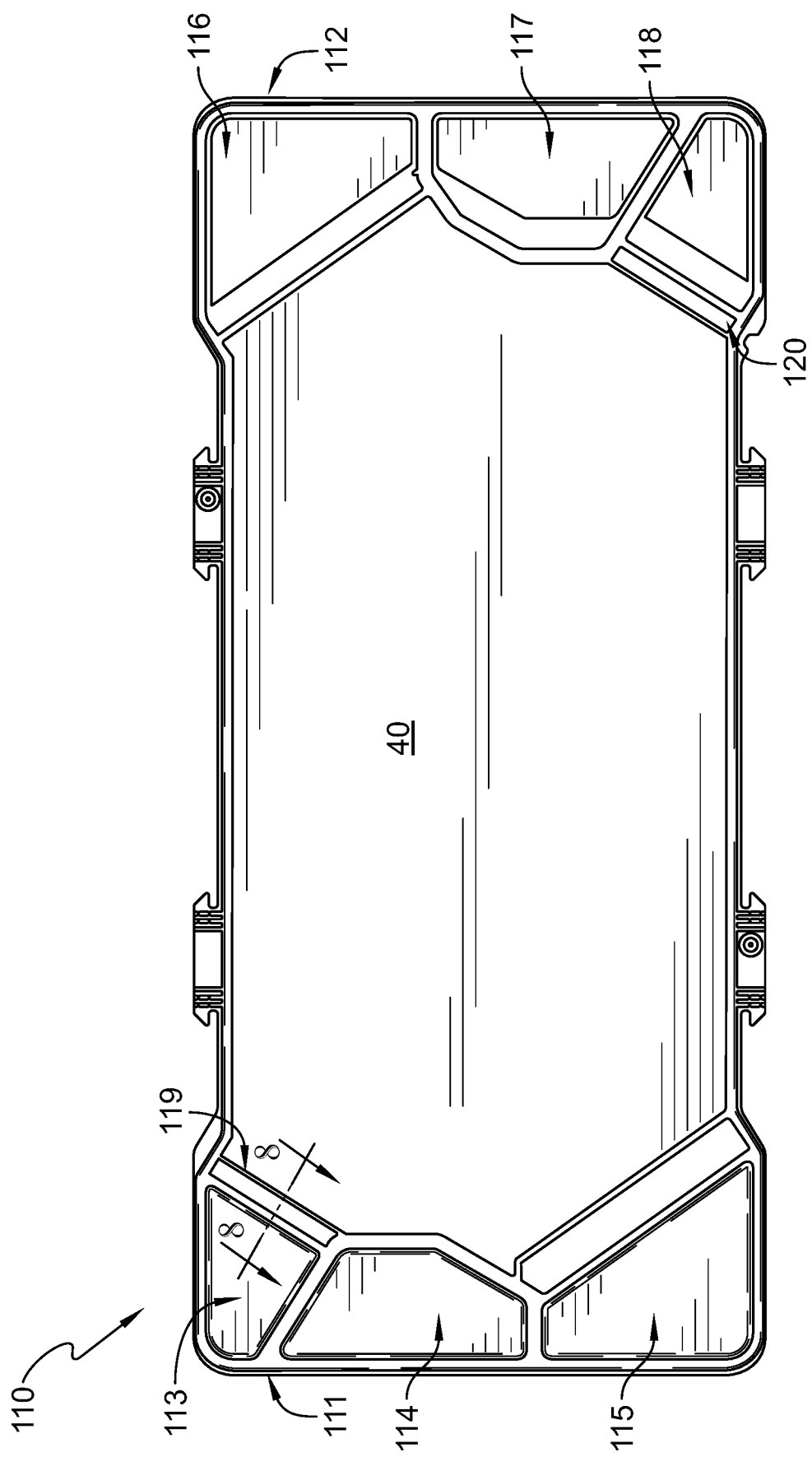
FIG. 3 is a top view of a bipolar plate according to the present disclosure configured to be used in the fuel cell stack of FIG. 1C, showing an inlet header, a flow field, and an exhaust or output header.

In the illustrated embodiment, as shown in FIGS. 1C, 2, and 3, the bipolar plates 28, 30 may be responsible for the transport of reactants 32, 34 and cooling fluid 36 in the fuel cell 20. As shown in FIG. 2, in the fuel cell 20 and/or fuel cell stack 12, the bipolar plates 28, 30 may be responsible for uniformly distributing reactants 32, 34 to an active area 40 of each fuel cell 20 through oxidant flow fields 42 and/or fuel flow fields 44. The active area 40, where the electrochemical reactions occur to generate power produced by the fuel cell 20, may be centered within the gas diffusion layers 24, 26 and the bipolar plates 28, 30. In other embodiments, the bipolar plates 28, 30 may be responsible for isolating or sealing the reactants 32, 34 within their respective pathways, all while being electrically conductive and robust.

The active area 40 may also have a lead-in or header region before and/or after the membrane electrode assembly 22. For example, the header region may ensure better distribution over the membrane electrode assembly 22. As will be described in greater detail below, as shown in FIG. 3, a bipolar plate 110, configured to be used as the bipolar plates 28, 30 in the fuel cell 20, includes a first header region 111 and/or a second header region 112 as the header regions. A person skilled in the art will understand that the bipolar plate 110 described with regard to FIGS. 3-10, as well as any other configuration or embodiment of such a bipolar plate described herein, can be utilized as a bipolar plate within any electrochemical system, such as an electrolysis system (e.g., an electrolyzer), an electrolyzer stack, and/or an electrolyzer cell (EC), as opposed to or in conjunction with the fuel cell 20 described above. For example, in some embodiments, the features and attributes described herein as related to the fuel cell bipolar plates (BPP) 28, 30 may also relate to and/or be incorporated by one or more electrolyzer plates 56, 58.

Referring back to FIG. 1C, the fuel cell 20 and/or fuel cell stack 12 may be supplied with oxidant (e.g., atmospheric air, oxygen, humidified air) 34 at the cathode side that is configured to flow over a first side of the bipolar plates 28, 30 and interact with the cathode gas diffusion layer 26. The fuel cell 20 and/or fuel cell stack 12 that is supplied with oxidant 34 may provide the necessary reactant to generate power. For example, a fuel cell 20 comprising an oxidant 34, from the constituents of dry air, may be subject to a chemical reaction on the cathode side of the membrane electrode assembly 22 represented as follows:

$$2H_2 + \lambda_{ca}(O_2 + (1/C_{O_2} - 1)N_2) \leftrightarrow 2H_2O + (\lambda_{ca} - 1)O_2 + \lambda_{ca}(1/C_{O_2} - 1)N_2 \quad (1)$$

The fuel cell 20 and/or fuel cell stack 12 may also be supplied with fuel (e.g., hydrogen) 32 at the anode that is configured to flow over a second side of the bipolar plates 28, 30 opposite the first side and interact with the anode gas diffusion layer 24. A fuel cell 20 and/or fuel cell stack 12 that is supplied with fuel 32 may provide the necessary reactant to generate power. A fuel cell 20 and/or fuel cell stack 12 that is supplied fuel 32 or hydrogen may be subject to a chemical reaction on the anode side of the membrane electrode assembly 22 represented as follows:

$$\lambda_{an} H_2 \rightarrow (\lambda_{an} - 1) H_2 \quad (2)$$

Referring back to the bipolar plates 28, 30 of the fuel cell 20, in some embodiments, the bipolar plates 28, 30 may provide mechanical support to prevent the fuel cell 20 and/or fuel cell stack 12 from bursting when pressurized. In other embodiments, the bipolar plates 28, 30 may provide rigidity for compressing and/or sealing the fuel cell 20, such as to provide an inherent and/or intrinsic seal of the fuel cell 20. In some other embodiments, one or more external seals may be comprised by the fuel cell 20. These sealing mechanisms isolate the oxidant 34, fuel 32, and/or cooling fluids (e.g., coolant) 36 to their respective flow field pathways 42, 44, 52 and/or prevent their leakage externally.

The oxidant flow fields 42, the fuel flow fields 44, and the cooling fluid (coolant) flow fields 52 may be in any configuration, such as parallel or non-parallel to each other. In some embodiments, each fuel cell 20 and/or fuel cell stack 12 may have one or more, many, multiple, or a plurality of the oxidant flow fields 42, the fuel flow fields 44, and the cooling fluid (coolant) flow fields 52, as well as a plurality of bipolar plates 28, 30, as shown in FIG. 2. For example, in one embodiment, a fuel cell 20 may have a bipolar plate 28, 30 that houses a network of flow fields that consist of about 10 to about 100 flow fields, comprising any number or range of flow fields comprised therein. In another embodiment, a fuel cell 20 may have a total of about 20 to about 40, about 40 to about 60, about 60 to about 100 flow fields, about 100 to about 300 flow fields, and comprising any number or range of flow fields comprised therein.

The bipolar plate 110 configured to be utilized as the bipolar plates 28, 30 in the fuel cell 20 is shown in FIGS. 3-10. The bipolar plate 110 may be comprised of formed sheets of material bonded or welded adjacent to each other. By way of non-limiting examples, the plate 110 may be formed of one, two, three, or more sheets. In the illustrated embodiment, the plate 110 is formed of two layered sheets 122, 142, as shown in greater detail in FIGS. 4A-4C and FIG. 8. The material of the sheets 122, 142 may be about 20% to about 100% metal, including any percentage or range of percentage of metal comprised therein. Typically, a sheet 122, 142 of a metal bipolar plate 110 may comprise about 50% to about 100% metal, including any percentage or range of percentage of metal comprised therein. In an exemplary embodiment, the sheet 122, 142 of the metal bipolar plate 110 may comprise about 50% to about 100% metal, including any percentage or range of percentage of metal comprised therein. In another embodiment, the sheet 122, 142 of the metal bipolar plate 110 may comprise about 90% to about 100% metal, including any percentage or range of percentage of metal comprised therein.

The material and structure of the metal bipolar plate 110 is important to the conductivity of the fuel cell 20 and/or fuel cell stack 12. In some embodiments, the material of the bipolar plate 110 is graphite. Similarly, the material of the bipolar plate 110 may or may not be any similar or different powder-based product that may be prepared by an impregnation and/or solidifying process, such as graphite-based powders. Graphite and other such materials of the bipolar plate 110 do not have the capacity to retain the necessary strength or uniformity to support the fuel cell 20 or fuel cell stack 12 without maintaining a certain minimum width or thickness.

For example, the minimum thickness of a graphite bipolar plate 110 may range from about 0.120 mm to about 0.250 mm, including any specific or range of thickness comprised therein (e.g., about 0.120 mm and/or about 0.240 mm). The upper limit of the thickness of a graphite bipolar plate 110 may be about 0.500 mm. Therefore, the full range of thickness of a graphite bipolar plate 110 may range from about 0.120 mm to about 0.500 mm, including any specific or range of thickness comprised therein (e.g., about 0.120 mm to about 0.500 mm or about 0.240 mm to about 0.500 mm).

In contrast, the forming of metal into bipolar plates 110 is slightly different as the channels are formed into corrugations, rather than blocks with depressions as in the graphite. In particular, metal as a material of the bipolar plate 110 has considerably lower thickness or width limitations. For example, one sheet of a metal bipolar plate 110 would have a thickness that ranges from about 0.050 mm to about 0.100 mm, including any specific or range of thickness comprised therein. Therefore a bipolar plate 110 for an electrolyzer (i.e., an electrolyzer plate) that may only require a single sheet would have a minimum thickness ranging from about 0.050 mm to about 0.100 mm, including any specific or range of thickness comprised therein. Since a fuel cell bipolar plate 110 requires at least 2 sheets, the minimum thickness for a metal bipolar plate 110 of a fuel cell 20 would range from about 0.100 mm to about 0.200 mm, including any specific or range of thickness comprised therein.

Notably, the metal bipolar plate 110 design often allows for space sharing between the coolant and the reactants. Specifically, in a metal bipolar plate 110, the middle space is flanking the reactant spaces. However, in a graphite bipolar plate 110, this "nesting" of domains is more difficult to achieve.

The metal of the bipolar plate 110 may be any type of electrically conductive metal, including but not limited to austenitic stainless steel (304 L, 316 L, 904 L, 310 S), ferritic stainless steel (430, 441, 444, Crofer), Nickel based alloys (200/201, 286, 600, 625), titanium (Grade 1, Grade 2), or aluminum (1000 series, 3000 series). Exemplary metals comprised by the metal bipolar plate 110 may be steel, iron, nickel, aluminum, and/or titanium, or combinations thereof.

The sheets 122, 142 of the metal bipolar plate 110 may be sealed, welded, stamped, structured, bonded, and/or configured to provide the flow fields 42, 44, 52 for the fuel cell fluids 34, 32, 36 (e.g., two, three, or more fluids). One or more sheets 122, 142 of the metal bipolar plate 110 are configured to be in contact, to overlap, to be attached, or connected to one another in order to provide the flow fields 42, 44, 52 for the fuel cell fluids 34, 32, 36.

In some embodiments, one or more sheets 122, 142 of the metal bipolar plate 110 may be coated with one or more coatings 123 for corrosion resistance using any method known in the art (e.g., spraying, dipping, electrochemically bathing, adding heat, etc.). In some embodiments, the coating 123 may be metal based and include, but not limited to, elements such as zinc, chromium, nickel, gold, platinum, and various alloys or combinations thereof. In other embodiments, the coating 123 may be a graphite-based coating 123 that protects, reduces, delays, and/or prevents the bipolar plate 110 from corroding (e.g., rusting, deteriorating, etc.). Since graphite has the inability to oxidize, it may be advantageous to coat the metal of the bipolar plate 110 with a graphite coating 123.

In the illustrated embodiment, the bipolar plate 110 includes the first header region 111 and the second header region 112, as shown in FIG. 3. The first header region 111 includes a first manifold 113 (also referred to as a port), a second manifold 114, and a third manifold 115. Each manifold 113, 114, 115 may be formed as a sizable opening formed towards one side of the plate 110. In some embodiments, the outer contours of each manifold 113, 114, 115 may match the contour of the outer edge of the plate 110 on that side of the plate 110. In the illustrated embodiment, the first manifold 113 is located in an upper left corner of the plate 110 and includes a feed portion 119 configured to facilitate feeding of the fluids 34, 32, 36 described above into the active area 40 of the plate 110 so as to interact with the associated gas diffusion layer 24, 26. A person skilled in the art will understand that the feed portion 119 is not limited to only the first manifold 113, and other manifolds 114, 115 may also include feed portions in other embodiments of the present disclosure.

Similar to the manifolds 113, 114, 115, the bipolar plate 110 further includes a fourth manifold 116, a fifth manifold 117, and a sixth manifold 118, as shown in FIG. 3. Each manifold 116, 117, 118 may be formed as a sizable opening formed towards a side of the plate 110 opposite the side on which the manifolds 113, 114, 115 are formed. In some embodiments, the outer contours of each manifold 116, 117, 118 may match the contour of the outer edge of the plate 110 on that side of the plate 110.

In the illustrated embodiment, the sixth manifold 118 is located on a lower right corner of the plate 110 and includes an outlet portion 120 configured to facilitate removal of the fluids 32, 34, 36 described above away from the active area 40 of the plate 110. In the illustrated embodiment, the manifolds 113, 116, and 117 are formed as inlet manifolds, and the manifolds 114, 115, and 118 are formed as outlet manifolds. A person skilled in the art will understand that different manifolds may be formed as inlets and outlets, as well as combinations that include all inlets and outlets formed on the same side of the plate, or on differing sides of the plate, as shown in the illustrated embodiment.

In the illustrated embodiment, the bipolar plate 110 is comprised of two sheets 122, 142 as shown in FIGS. 4A-4C. The sheets 122, 142 are layered on top of each other to form the bipolar plate 110. Each sheet 122, 142 includes the manifolds 113, 114, 115, 116, 117, 118 described above such that when the sheets 122, 142 are arranged on top of each other, each manifold 113, 114, 115, 116, 117, 118 of the bipolar plate 110 is formed. A person skilled in the art will understand that, although the manifolds 113, 114, 115, 116, 117, 118 are shown conceptually as rectangular shapes in FIGS. 4A-4C, the manifolds 113, 114, 115, 116, 117, 118 may be formed of different shapes, including the more triangular shapes of the exemplary plate 110 shown in FIG. 3 in order to suit the consumption of their respective fluids 34, 32, 36.

FIG. 4A shows a top-down view of the first sheet 122 and FIG. 4B shows a top-down view of the second sheet 142 as it would be arranged under the first sheet 122. In some embodiments, the second sheet 142 is constructed similarly to the first sheet 122, and may be sealed, welded, affixed, bolted, and/or bonded to the first sheet 122.

Each sheet 122, 142 includes a plurality of seals 127, 147 as shown in FIGS. 4A and 4B. An important purpose of the bipolar plate 110 is to seal the reactants 32, 34 and coolant 36 so that they may remain isolated into their intended flow paths 42, 44, 52 and avoid leaking while moving within the fuel cell 20 and also avoid leaking out of the fuel cell 20. In the illustrated embodiment, the plurality of seals 127, 147 includes seals 128, 148 arranged around the perimeter of the bipolar plate 110 sheets 122, 142, as well as inlet and outlet seals 130, 131, 132, 133, 134, 135, 150, 151, 152, 153, 154, 155 arranged around the perimeter of each of the manifolds 113, 114, 115, 116, 117, 118 of the reactant and coolant ports. As shown in FIGS. 4A and 4B, the perimeter seals 128, 148 are arranged on each sheet 122, 142 such that the perimeter seals 128, 148 engage with each other when the sheets 122, 142 are assembled to form the plate 110.

In the illustrated embodiment, the inlet and outlet seals 130, 131, 132, 133, 134, 135, 150, 151, 152, 153, 154, 155, unlike the perimeter seals 128, 148, are not configured to be entirely aligned, but instead are staggered in at least some locations in order to facilitate specific flow arrangements, as shown in FIGS. 4A-4C. Specifically, the inlet and outlet seals 130, 131, 132, 133, 134, 135 are arranged on the first sheet 122 in a first arrangement. As shown in FIGS. 4A and 4B, a second arrangement of the inlet and outlet seals 150, 151, 152, 153, 154, 155 on the second sheet 142 is asymmetric to the first arrangement of the seals 130, 131, 132, 133, 134, 135 on the first sheet 122. However, in the illustrated embodiment, the second arrangement of the inlet and outlet seals 150, 151, 152, 153, 154, 155 on the second sheet 142 are "rotationally symmetric" to the first arrangement of seals 130, 131, 132, 133, 134, 135 relative to a central axis 129 that extends transversely across the plate 110 and that is perpendicular to longitudinal edges of the plate.

The central axis 129 is located longitudinally centrally along the plate 110 so as to divide the plate 110 into a first half portion and a second half portion. In other words, the second arrangement of seals 150, 151, 152, 153, 154, 155 on the second sheet 142 are identical to the first arrangement of seals 130, 131, 132, 133, 134, 135 on the first sheet 122 if the first arrangement of seals 130, 131, 132, 133, 134, 135 were rotated 180 degrees about a central point 124 of the plate 110.

The first and second arrangements of the seals 130, 131, 132, 133, 134, 135, 150, 151, 152, 153, 154, 155 creates a staggered seal arrangement when the sheets 122, 142 are stacked with each other, optimizing the plate 110 for certain fluid flows, as shown in FIG. 4C. Although the seals 130, 131, 132, 133, 134, 135 on the first sheet 122 are rotationally symmetric to the seals 150, 151, 152, 153, 154, 155 on the second sheet 142 in the illustrated embodiment, a person skilled in the art will understand that other staggered arrangements of the seals 130, 131, 132, 133, 134, 135, 150, 151, 152, 153, 154, 155 that are not symmetrical are also possible based on the requirements of the desired fluid flow arrangement.

In some embodiments, the bipolar plate 110 may have a total plate thickness of approximately 0.5 mm to 2 mm, including any specific or range of thickness comprised therein, and in particular, about 1.3 mm. The seals 130, 131, 132, 133, 134, 135, 150, 151, 152, 153, 154, 155 may have a total height of approximately 0.2 mm to 0.6 mm, including any specific or range of height comprised therein, and in particular, about 0.4 mm. The metal stampings that are welded together may result in a substrate thickness of approximately 0.15 mm to 0.2 mm, including any specific or range of thickness comprised therein, and in particular, about 0.2 mm. These values leave an approximate 0.6 mm of height gap. If the seals 130, 131, 132, 133, 134, 135, 150, 151, 152, 153, 154, 155 were placed directly on top of one another, this 0.6 mm height gap would decrease to a 0.2 mm height gap for the reactants 32, 34 or coolant 36 to pass through. However, if the seals 130, 131, 132, 133, 134, 135, 150, 151, 152, 153, 154, 155 are staggered as described above, then the staggered arrangement increases the height gap back to 0.6 mm, which is beneficial. As used herein, the term "approximately" refers to values within +/−0.1 mm.

It is advantageous to have the largest opening and/or height gap possible, without ineptly impacting the design, to enable the least amount of fluid 32, 34, 36 restriction possible. A large fluid 32, 34, 36 restriction can impact the robustness of the design by increasing parasitic losses and reducing the capacity to guide and maintain even distribution over the entire active area 40. Thus, the staggered seal arrangement improves the robustness of the plate 110 design by maximizing the height gap and fluid 32, 34, 36 flow through the plate 110. Moreover, the asymmetric design, or the rotational symmetry about 180 degrees of rotation, as described above, allows for the plate 110 to be much thinner than conventional bipolar plates 110. Even further, the present design enables the use of a single anode and cathode forming die, which increases efficiency and decreases costs of producing and manufacturing the present plate 110.

FIG. 4C shows the assembled bipolar plate 110 including the first and second sheets 122, 142 stacked on top of each other. As can be seen in FIG. 4C, each of the pairs of seals (first manifold 113 seals 130, 150, second manifold 114 seals 131, 151, third manifold 115 seals 132, 152, fourth manifold 116 seals 133, 153, fifth manifold 117 seals 134, 154, and sixth manifold 118 seals 135, 155) have a staggered portion located on an inner portion of the manifold 113, 114, 115, 116, 117, 118. As will be described in greater detail below, these staggered portions allow for fluid 34, 32, 36 flowing into the manifold 113, 114, 115, 116, 117, 118 to flow in an 5-pattern (e.g. over and under) the staggered seals 130, 131, 132, 133, 134, 135, 150, 151, 152, 153, 154, 155.

Figure 5:
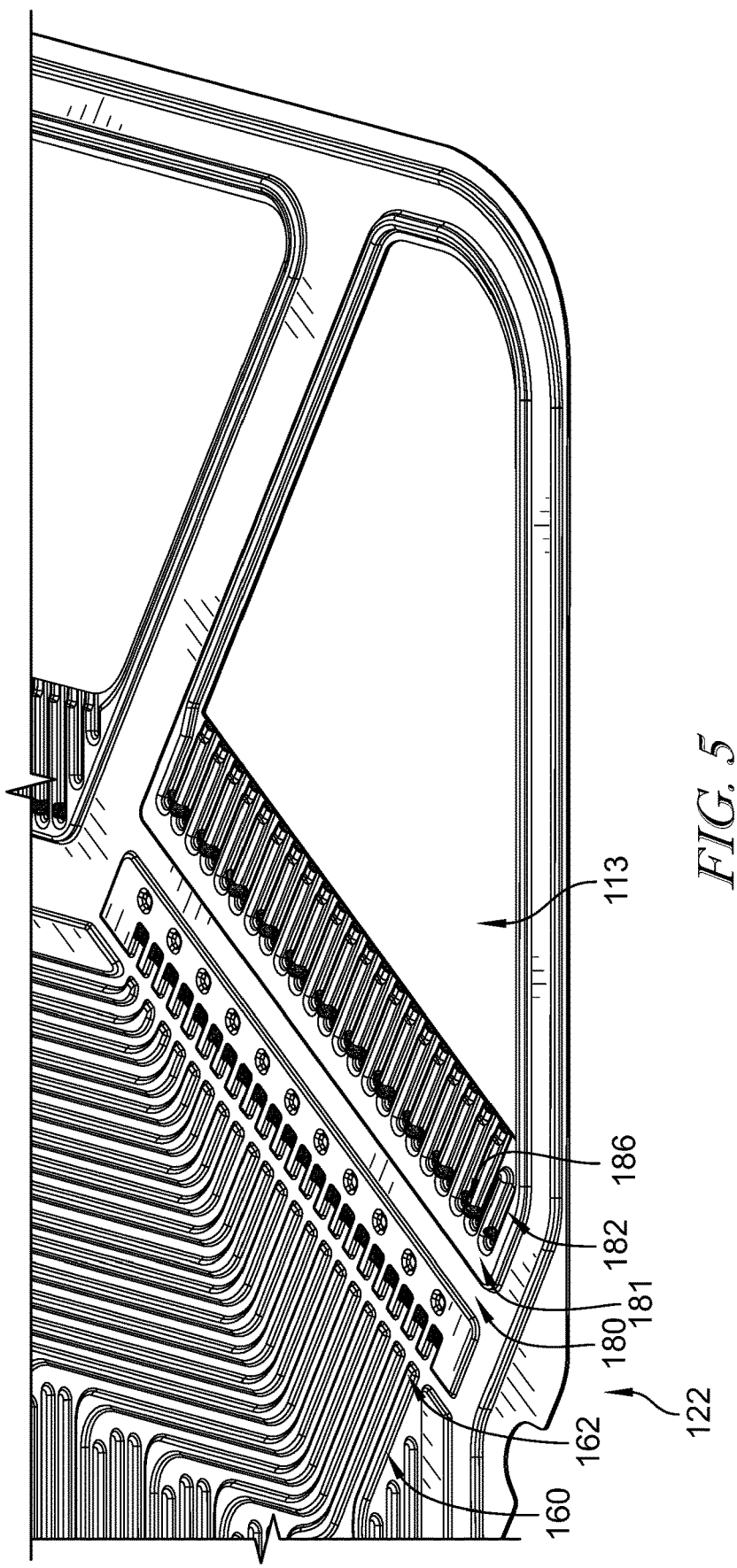
FIG. 5 is a perspective view of a portion of an inlet of the bipolar plate of FIG. 3, showing that the plate includes multiple raised feed channels and multiple active channels in the flow field.
Figure 6:
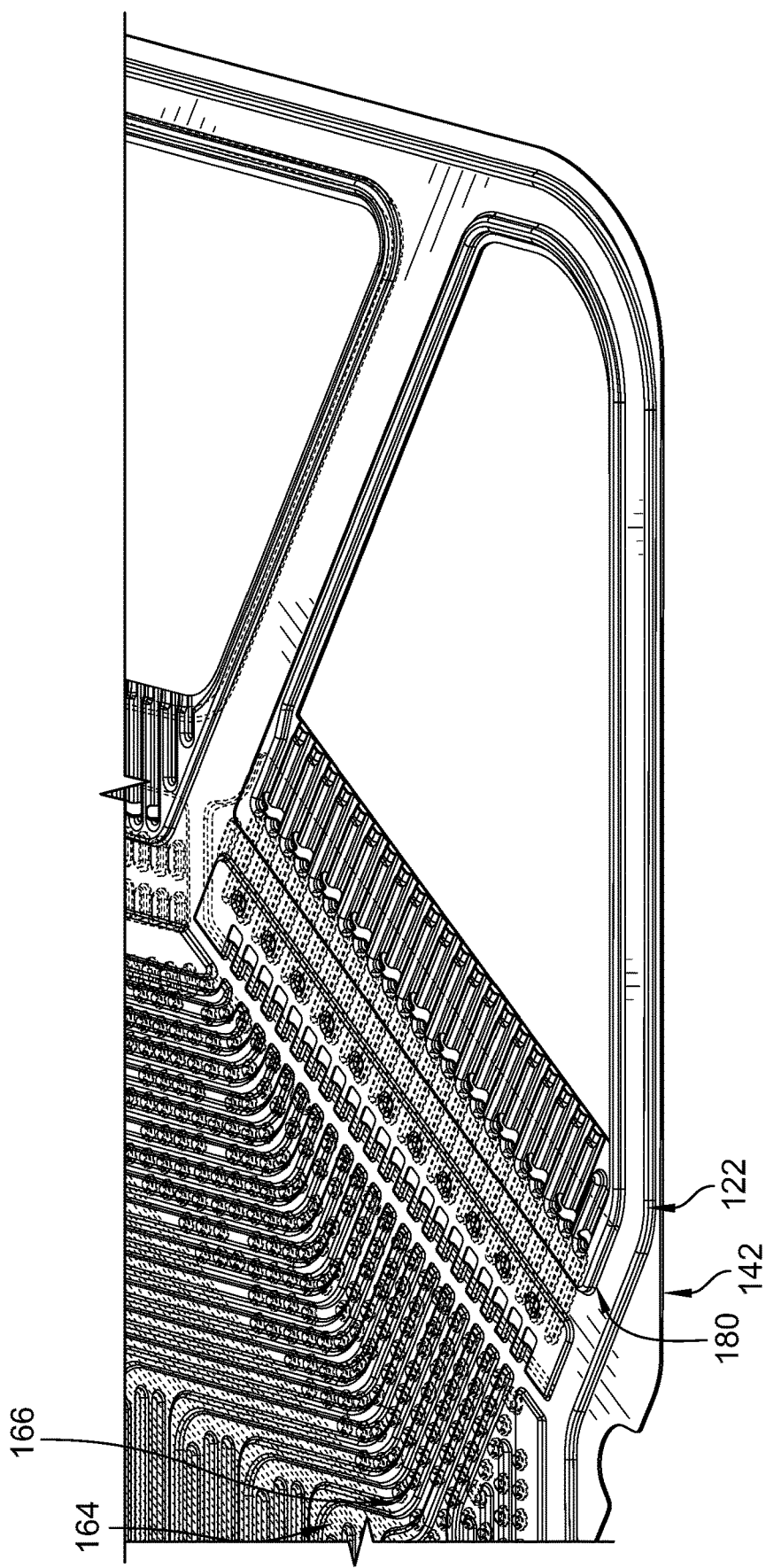
FIG. 6 is a perspective view of a portion of the inlet of FIG. 5, showing a wire-frame view of the plate such that a lower sheet is visible through an upper sheet.
Figure 7:
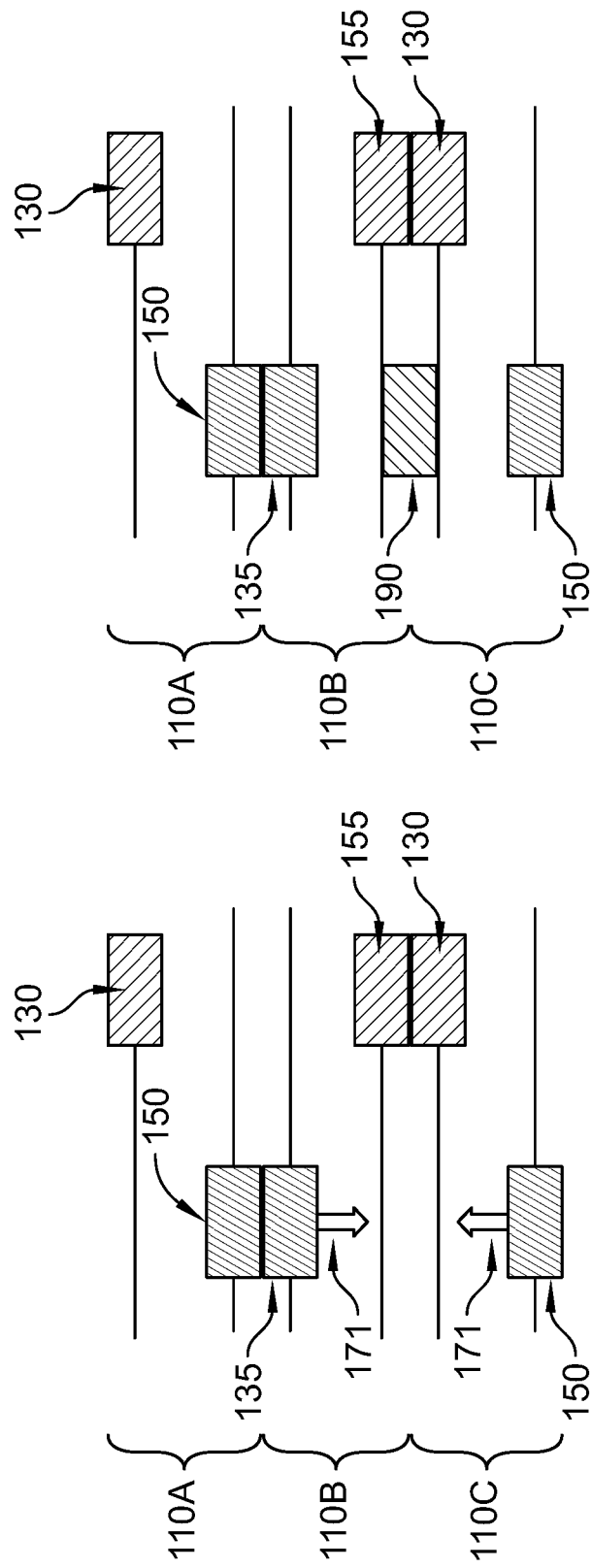
FIG. 7A is a diagrammatic view of the fuel cell stack of FIG. 1C utilizing the bipolar plate of FIGS. 3-4C though the line 7-7 in FIG. 4C, showing that a stack of plates may experience a bending moment at outer seals.
FIG. 7B is a diagrammatic view of the fuel cell stack of FIG. 1C utilizing the bipolar plate of FIGS. 3-4C though the line 7-7 in FIG. 4C, showing that a stack of plates each include a raised feed channel protruding therefrom that engages with a raised feed channel of an adjacent bipolar plate to counteract the bending moment of the plates.

The bipolar plate 110 further includes protrusions and/or indentations 162 that form channels 160 of the active area 40 that define the cathode and/or anode channels 42, 44, as shown in FIG. 5. In the illustrated embodiment, a plurality of first channels 160 are formed between the plurality of protrusions 162 extending away from the first sheet 122. Similarly, a plurality of second channels 164 are formed between a plurality of protrusions 166 extending away from the second sheet 142, as shown in FIG. 6.

In the illustrated embodiment, the first channels 160 extend across the sheet 122 from at least the first manifold 113 formed as an inlet, through the active area 40, and to the sixth manifold 118 formed as an outlet. The protrusions 162 that define the flow paths of the channels 160 extend in a first direction across the active area 40 of the plate 110. Similarly, the second channels 164 extend across the second sheet 142. In some embodiments, the second channels 164 may extend from at least the third manifold 115, through the active area 40, and to the fourth manifold 116. As such, the protrusions 166 define the flow paths of the channels 164 that extend in a second direction across the active area 40 of the plate 110 that is different than the first direction of the channels 160.

The protrusions 166 may lead into the active area 40 to distribute reactants 32, 34 evenly amongst the plurality of channels 164. The protrusions 166 may be of equal or lesser channel count in comparison to protrusions 162, which may enable performance and/or packaging advantages. The protrusions 166 may bifurcate into protrusions 162 at various ratios ranging from 1:1 to 1:20, including any specific or range of ratios comprised therein, for the range of protrusions 166 to protrusions 162, respectively. A person skilled in the art will understand that the channels 160, 164 may extend in different directions than those shown in FIGS. 5 and 6, and may extend in the same directions in some embodiments.

In the illustrated embodiment, the bipolar plate 110 is configured to engage both an anode gas diffusion layer 24 and a cathode gas diffusion layer 26. In particular, one of the first and second channels 160, 164 may be configured to engage the anode gas diffusion layer 24, and the other of the first and second channels 160, 164 may be configured to engage the cathode gas diffusion layer 26. The direction of flow, the depth, and other parameters of the flow channels 160, 164 may be optimized for which of the anode and cathode gas diffusion layers 24, 26 the channels 160, 164 are engaged with, as a person skilled in the art will understand.

As described above, multiple bipolar plates 110 may be stacked relative to each other with diffusion layer assemblies 101 arranged between the plates 110. So long as the flow paths and active areas 40, the manifolds 113, 114, 115, 116, 117, 118, and seals 130, 131, 132, 133, 134, 135, 150, 151, 152, 153, 154, 155 are designed symmetrically, multiple plates 110 may be stacked together with diffusion layer assemblies 101 therebetween, as shown in FIGS. 7A and 7B, where each subsequent plate 110 is rotated 180 degrees, such that the neighboring seals 130, 131, 132, 133, 134, 135, 150, 151, 152, 153, 154, 155 and raised feed channels 182, 184 (described below) align with each other.

In the illustrated example, three plates 110 (labeled as 110A, 110B, and 110C for clarity) are assembled in the aforementioned arrangement, where the seals 130, 131, 132, 133, 134, 135, 150, 151, 152, 153, 154, 155 are always in contact, as shown in FIGS. 7A and 7B. Because the stack of plates 110 is under compression, the outside seals 135, 150 will produce a bending moment (illustrated by force vectors 171) about the inside seals 130, 155 because of the gap between seals 135 and 150. The bending moment 171 could cause the plate 110 to locally deform. The deformation may be caused by several issues with the design.

Firstly, the deformation may be a result of a lack of reaction force, meaning rather than the seals being backed by a neighboring seal or wall, the seals are only supported by the cantilever of the plate 110. Because the plate 110 is a thin sheet metal, the 'push back,' or reaction force caused by this design is not substantial enough to form a strong seal force. This is likely to result in insufficient sealing. Secondly, the deformation may cause a planar misalignment, which is likely to cause additional issues with robustness and inaccuracy during the building, production, and/or manufacturing process.

In order to prevent the outer seals 135, 150 from producing the bending moment 171, as shown in FIG. 7A, each sheet 122, 142 may include a hard stop or interference feature 190 extending away therefrom, as shown in FIG. 7B. The interference feature 190, which may be raised feed channels 182, 184 (as will be described below) extending away from and toward adjacent plates 110, may form a raised feed channel region 180. By having a feature 190 that protrudes in this manner, toward the neighboring plate 110 and beneath the outer seals 135, 150, a physical interference 190 is produced, which prevents deflection of the outer sections of the plates 110 towards one another, thus retaining sealing, parallelism, and alignment.

Figure 8:
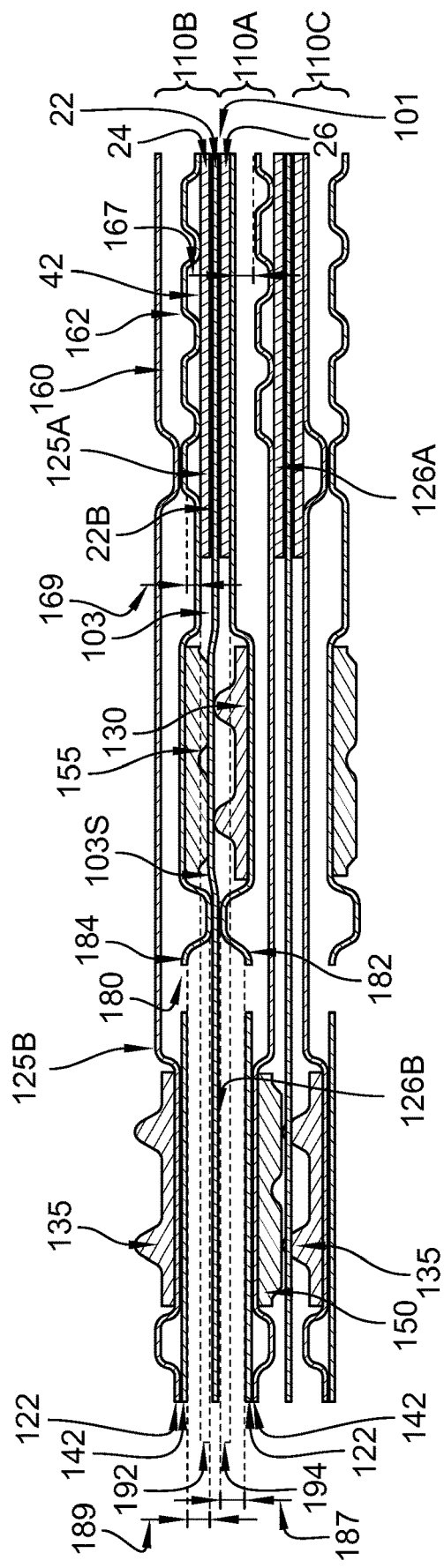
FIG. 8 is a cross-sectional view of an inlet manifold of the bipolar plate of FIG. 3 through the line 8-8, showing the engagement between the raised feed channels of adjacent bipolar plates.

FIG. 8 shows an exemplary section of adjacent plates 110 (labeled as 110A, 110B, and 110C for clarity) at the first manifold 113 formed as an inlet, in particular showing raised feed channels 182, 184 of neighboring plates 110 that form the interference feature 190. In the illustrated embodiment, the first bipolar plate 110A includes a first upper side 125A and a first lower side 126B formed by the first sheet 122 and the second sheet 142 stacked together, the first upper side 125A including the inner seal 130 protruding upwardly away from the top of the first sheet 122 toward the adjacent second bipolar plate 110B. The first plate 110A further includes a first raised feed channel 182 formed adjacent to and outwardly of the inner seal 130. The first raised feed channel 182 protrudes upwardly away from the sheet 122 in the same direction as the inner seal 130.

Similarly, the second bipolar plate 110B is arranged above the first bipolar plate 110A and includes a second upper side 125B and a second lower side 126B formed by the first sheet 122 and the second sheet 142 stacked together, the second lower side 126B including the inner seal 155 protruding downwardly away from the bottom of the sheet 142 toward the adjacent first bipolar plate 110A. The second plate 110B further includes a second raised feed channel 184 formed adjacent to and outwardly of the inner seal 155. The second raised feed channel 184 protrudes downwardly away from the second sheet 142 in the same direction as the inner seal 155.

A diffusion-electrode assembly 101 is arranged between the first bipolar plate 110A and the second bipolar plate 110B and inwardly of the inner seals 130, 155 and the first and second raised feed channels 182, 184. The diffusion-electrode assembly 101 includes the membrane electrode assembly 22 arranged between the first gas diffusion layer 24 and the second gas diffusion layer 26, each configured to engage with the fluids 34, 32, 36 flowing through the channels 160, 164. In the illustrated embodiment, the membrane electrode assembly 22 includes an electrode body 22B and a membrane frame 103 extending outwardly away from the electrode body 22B toward the outer edge of the plate 110.

As can be seen in FIG. 8, the membrane frame 103 extends between the inner seals 130, 155 and between the first and second raised feed channels 182, 184. The bipolar plates 110A, 110B, 110C cannot make direct surface contact in order to avoid electrically shorting the fuel cell 20. Thus, in order to account for an electrical barrier between each bipolar plate 110A, 110B, 110C, the membrane frame 103 extends between the seals 130, 155 and feed channels 182, 184. The membrane frame 103 can be generally planar, and may be comprised of a polyethylene naphthalate (PEN) plastic substrate, highly electrically insulative materials, and/or other elastomers known in the art.

In the illustrated embodiment, the first bipolar plate 110A and the second bipolar plate 110B are spatially arranged in parallel with each other and are aligned such that the inner seals 130, 155 and the raised feed channels 182, 184 are entirely aligned with each other. As such, when compressed to form the fuel cell stack 12, the first raised feed channel 182 and the second raised feed channel 184 contact the membrane frame 103 arranged therebetween so as to prevent mechanical deformations of the first and second bipolar plates 110A, 110B. The inner seals 130, 155 also sealingly engage the membrane frame 103 in order to prevent internal and/or external leakage.

The first lower side 126A of the first bipolar plate 110A formed by the second sheet 142 includes the outer seal 150 protruding downwardly away from the bottom of the sheet 142, as shown in FIG. 8. The outer seal 150 is spaced apart outwardly from the inner seal 130 and the first raised feed channel 182 such that the first raised feed channel 182 is located between the inner seal 130 and the outer seal 150 in a longitudinal direction of the first bipolar plate 110A. The contact between the first raised feed channel 182, the second raised feed channel 184, and the membrane frame 103 prevents mechanical deformations of the first and second bipolar plates 110A, 110B in response to the outer seal 150 being acted on by an external force, such as an outer seal 135 of a further third bipolar plate 110C arranged below the first bipolar plate 110A.

Similarly, the second upper side 125B of the second bipolar plate 110B formed by the first sheet 122 includes the outer seal 135 protruding upwardly away from the top of the first sheet 122, as shown in FIG. 8. The outer seal 135 is spaced apart outwardly from the inner seal 155 and the second raised feed channel 184 such that the second raised feed channel 184 is located between the inner seal 155 and the outer seal 135 in a longitudinal direction of the second bipolar plate 110B. The contact between the first raised feed channel 182, the second raised feed channel 184, and the membrane frame 103 prevents mechanical deformations of the first and second bipolar plates 110A, 110B in response to the outer seal 135 being acted on by an external force, such as an outer seal of a further bipolar plate 110 (not shown) arranged above the second bipolar plate 110B.

In the illustrated embodiment, each bipolar plate 110 that is stacked above or below a neighboring bipolar plate 110 is rotated 180 degrees before being stacked on the neighboring plate 110. This is done because the plates 110 are formed to be rotationally symmetric about the center axis 129. For example, with reference to FIG. 4C, the seal 130 of the first sheet 122 may be located on a top side of the plate 110, the seal 150 of the second sheet 142 may be located on a bottom side of the plate 110, the seal 135 may be located on the top side, and the seal 155 may be located on the bottom side. If a subsequent plate 110 is rotated 180 degrees clockwise or counterclockwise about the center point 124 (in particular about an axis of rotation extending perpendicularly through the center point 124) and placed on top of the first plate 110, the seal 155 of the subsequent plate 110, having the same size and shape as the seal 130 of the first plate 110, will perfectly align with and engage the seal 130 of the first plate 110, as can be seen in FIG. 4C. This process can be repeatedly performed until the entire fuel cell stack 12 is assembled.

Figure 9:
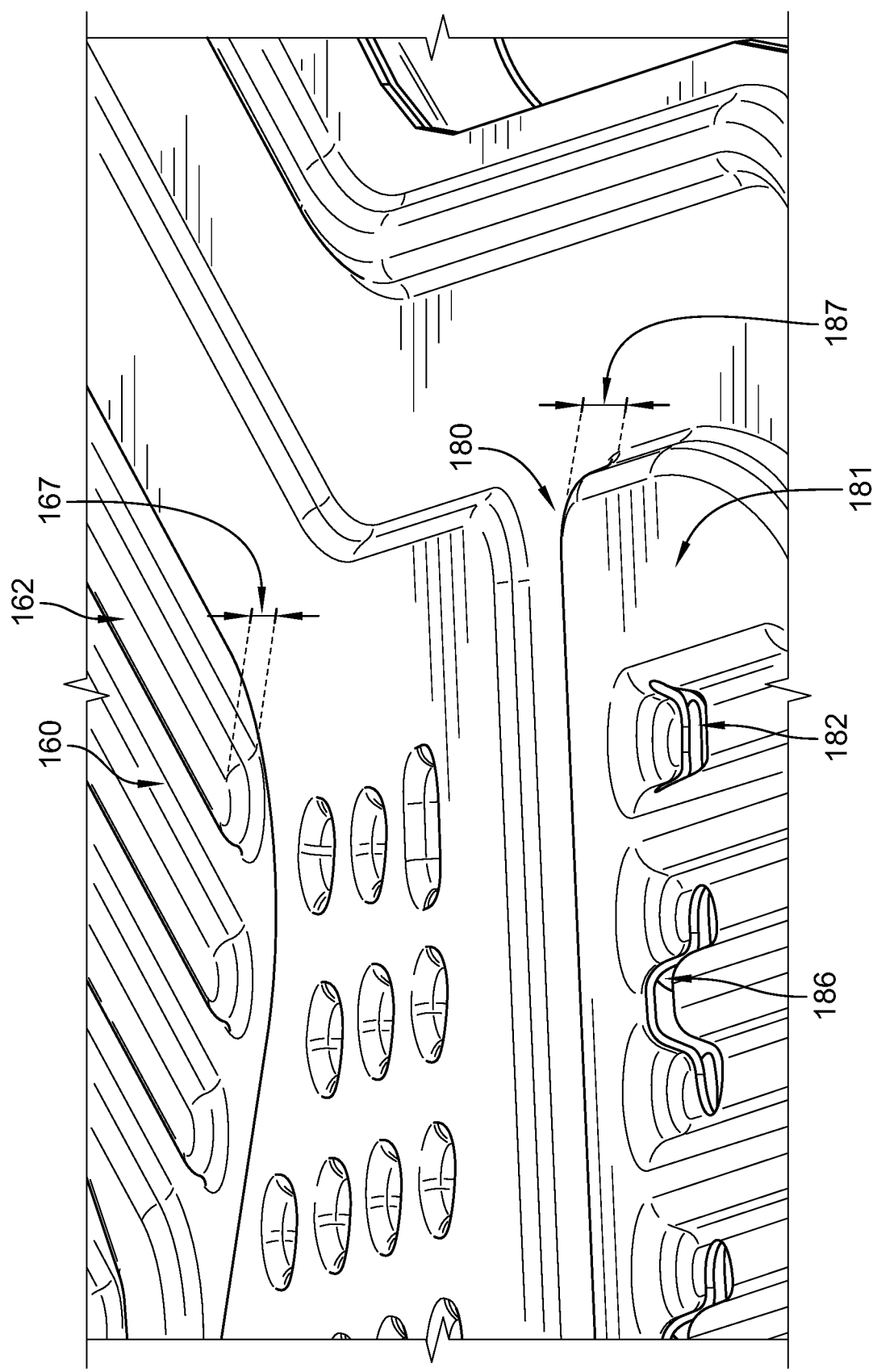
FIG. 9 is a perspective view of a portion of a back-side of the bipolar plate of FIG. 3, showing the height of the protrusions forming the multiple active channels and the height of the raised feed channels.

The raised feed channels 182, 184 are formed to be taller than the protrusions 162, 166 that form the channels 160, 164, or in other words, the channel depth. As shown in FIG. 9, which is a back-side view of the plate 110, the raised feed channel region 180 of the top side of the plate 110 (the top, first sheet 122) includes a raised platform 181 that extends along a portion of the manifold in which the feed channel region 180 is arranged, in particular the first manifold 113 is formed as an inlet 113 in the illustrated embodiment. The region 180 includes multiple first raised feed channels 182 that extend away from a top surface of the platform 181 approximately a distance 187. As can be seen in FIGS. 8 and 9, the distance 187 is greater than a depth 167 of the channels 160 and their protrusions 162.

Similarly, the bottom side of the plate 110 (the bottom, second sheet 142) may include a raised feed channel platform 181 in the region 180, which includes the plurality of raised feed channels 184. As shown in FIG. 8, the second raised feed channels 184 extend away from a top surface of the platform 181 approximately a distance 189. As can be seen in FIG. 8, the distance 189 is greater than a depth 169 of the channels 164 and their protrusions 166.

In some embodiments, one of the channels that form the cathode channels 44 are deeper than the channels that form the anode channels 42. For example, in at least one embodiment, the cathode channels 44 may be formed with a depth in the range of 0.2 mm to 0.5 mm, including any specific or range of depth comprised therein, while the anode channels 42 may be formed with a depth that is slightly less than the cathode channels 44, particularly within a range of 0.15 mm to 0.35 mm, including any specific or range of size comprised therein. A person skilled in the art will understand that, in other embodiments, the anode channels 42 may be equally as deep as the cathode channels 44, although the flow field designs may slightly differ.

The determination of the height of the feed channels 182, 184 also takes into account the diffusion-electrode assembly 101 thickness. This is done so that both sets of staggered seals 130, 131, 132, 133, 134, 135, 150, 151, 152, 153, 154, 155 as well as the raised feed channels 182, 184 all make contact at the same place and time during manufacture in order to maintain a near perfect planar compression set. Because the diffusion-electrode assembly 101 and seals 130, 131, 132, 133, 134, 135, 150, 151, 152, 153, 154, 155 experience deflection during compression, the compressed heights of both gas diffusion layers 24, 26 and the seals 130, 131, 132, 133, 134, 135, 150, 151, 152, 153, 154, 155 need to be considered such that the final compressed state of the stack 12 simultaneously facilitates all the subcomponent requirements.

Determination of raised feed channel 182, 184 height may be described as follows. For the height of the cathode feed channels 182, the sum of the depth of the cathode channels 44 plus the cathode gas diffusion layer 26 compressed thickness is determined plus half of the MEA 22 thickness. The equation is as follows:

$$\text{Cathode feel channel height} = \text{Cathode channel depth} + \text{GDL thickness} + \frac{\text{MEA thickness}}{2}$$

For the anode feed channels 184, the sum of the depth of the anode channels 42 plus the anode gas diffusion layer 24 compressed thickness plus half of the MEA 22 thickness. The equation is as follows:

$$\text{Anode feel channel height} = \text{Anode channel depth} + \text{GDL thickness} + \frac{\text{MEA thickness}}{2}$$

The raised feed channels 182, 184 are formed to be taller than the protrusions 162, 166 that form the channels 160, 164, or in other words, the channel depth. Therefore, the additional height of the raised feed channels 182, 184 compared to the protrusions 162, 166 is essentially made up of half of the diffusion-electrode assembly 101 (e.g. one gas diffusion layer 24, 26 and half of the MEA 22).

As described above, the flow field depth of the anode and cathode feed channels 182, 184 may differ due to several fluidic reasons. Firstly, the viscosity of each reactant 32, 34 is drastically different. Hydrogen possesses a much smaller dynamic viscosity value than air, making it much easier to flow through or around any given geometry. Secondly, the excess stoichiometric values differ between the anode and cathode. A typical anode excess stoichiometry is 1.5, while a typical cathode excess stoichiometry is 2.0. This stoichiometric ratio (1.5:2.0) results in a much higher volumetric flow requirement for the cathode flow fields.

Therefore, in at least one embodiment, it is reasonable for the anode flow field to be approximately half the height of the cathode flow field. If the feed channels 182, 184 are increased equally from their respective flow field depths, the cathode feed channels would be considerably taller than the feed channels 182, 184. Tall channels, formed from metal sheets, are more difficult to achieve due to the thinning effect of the substrate material as it is plastically formed into the channel geometry. In order to avoid excessive thinning of the bipolar plate 110 during manufacture, the feed channels 182, 184 are designed to be the average height between the two sums described above (e.g., the cathode feed channel height and the anode feed channel height).

A plate embodiment with exemplary flow field heights includes an anode flow field height of 0.15 mm, a cathode flow field height of 0.3 mm, and a total diffusion-electrode assembly 101 height of 0.4 mm. Thus, the anode flow field plus half of the diffusion-electrode assembly 101 is equal to 0.35 mm, and the cathode flow field plus half of the diffusion-electrode assembly 101 is equal to 0.5 mm. As such, the averaged value of the two sums (0.35 mm+0.50 mm) divided by two (2) is equal to 0.425 mm, which is the height of each feed channel 182, 184. This formulaic approach creates offsets 192, 194 between the two plates 110A, 110B due to the difference between channel 160, 164 heights and raised feed channel 182, 184 heights being different at the juncture of two plates 110A, 110B, as shown in FIG. 8. Because the offsets 192, 194 must essentially be shared, the midline of the MEA 22 is now slightly offset and the membrane frame 103 may be biased towards the upper plate 110A. This creates a slope 103S in the membrane frame 103 between the raised feed channels 182, 184 and the seals 130, 155, as shown in FIG. 8.

Figure 10:
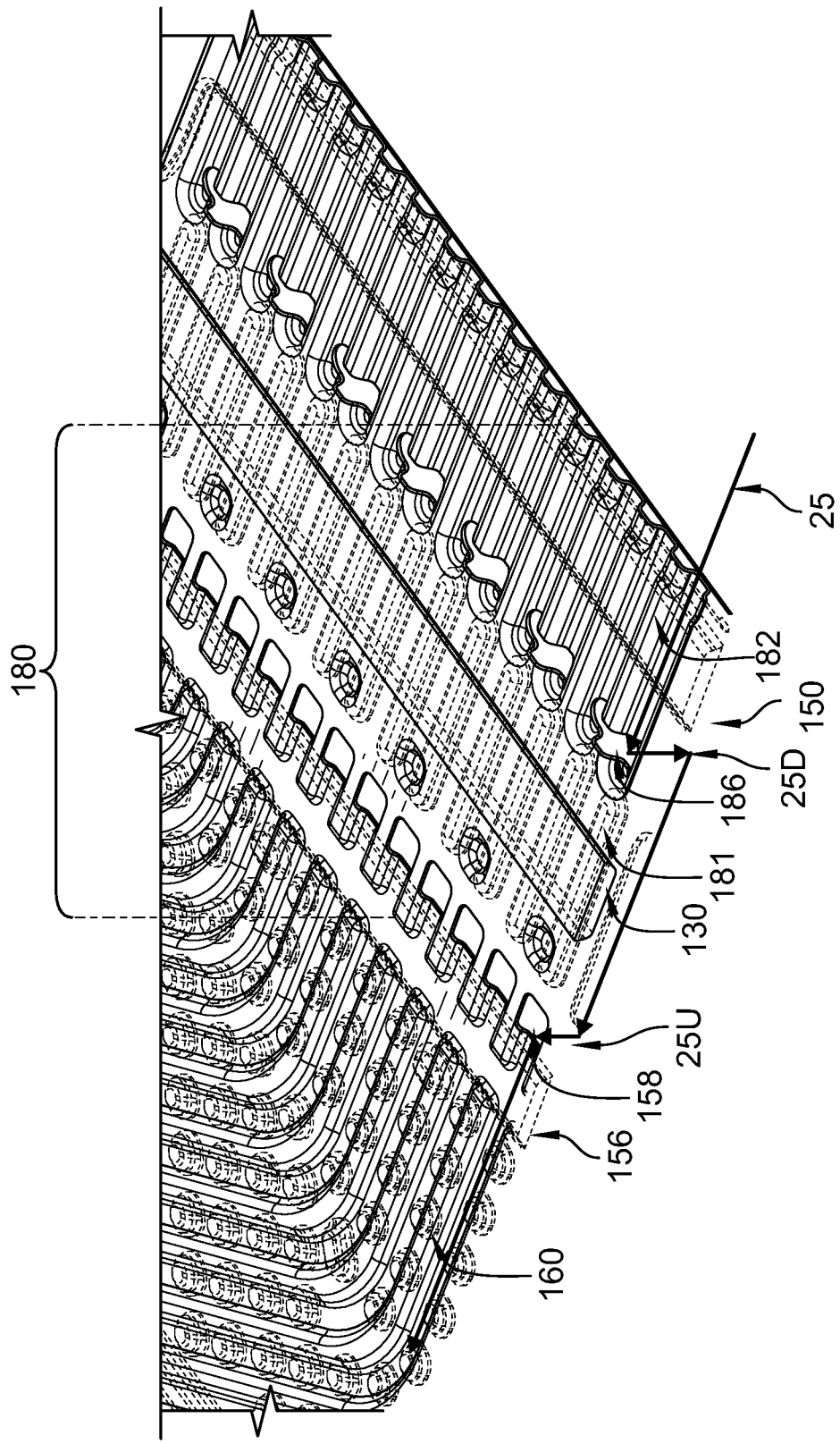
FIG. 10 is a perspective view of a portion of the inlet of the bipolar plate of FIG. 8, showing the intended flow path of the fluid.

FIG. 10 shows a magnified wireframe view of the inlet 113 section shown in FIGS. 5 and 6. The feed channel region 180 includes the platform 181 with the plurality of raised feed channels 182 formed therein. The locations of seals 130, 150 are shown, as well as the location of an additional, optional, active area seal 156. In the illustrated embodiment, an inlet flow path 25 flows into the raised feed channel 182 from a source, and subsequently flows through a feed channel opening 186 formed in the feed channel 182. Although not shown due to the view in FIG. 10, the feed channels 184 of the sheet 142 may also include feed channel openings 186 formed therein. The fluid 34, 32, 36 flows downwardly through a downward flow section 25D after entering the opening 186, flows under the seal 130, and then upwardly through an upward flow section 25U and through an opening 158 formed before the channels 160. The fluid may then flow through the channels 160 and interact with the corresponding gas diffusion layer 24, 26.

A method of forming a fuel cell 20 according to another aspect of the present disclosure includes providing a plurality of bipolar plates 110 that are generally rectangular and planar. Each bipolar plate 110 includes (i) a first outer seal 150 protruding downwardly away from the plate 110, a first inner seal 130 protruding upwardly away from the plate 110, and a first raised feed channel 182 protruding upwardly away from the plate 110. The first outer seal 150, the first inner seal 130, and the first raised feed channel 182 arranged on an inlet 113 of the bipolar plate 110. Each bipolar plate 110 also includes (ii) a second inner seal 155 protruding downwardly away from the plate 110, a second outer seal 135 protruding upwardly away from the plate 110, and a second raised feed channel 184 protruding downwardly away from the plate 110. The second outer seal 135, the second inner seal 155, and the second raised feed channel 184 are arranged on an outlet 118 of the bipolar plate 110. The inlet 113 is located in a first corner 141 of the plate 110 and the outlet 118 is located in a second corner 143 of the plate 110 diagonally opposite of the first corner 141.

The method further includes providing at least one diffusion-electrode assembly 101 including a membrane electrode assembly 22 and two gas diffusion layers 24, 26 surrounding the membrane electrode assembly 22. The membrane electrode assembly 22 includes an electrode body 22B and a membrane frame 103 extending away from the electrode body 22B. The method further includes arranging a first bipolar plate 110A of the plurality of bipolar plates 110 in a first position and arranging a first diffusion-electrode assembly 101 of the at least one diffusion-electrode assembly 101 above the first bipolar plate 110A such that one of the two gas diffusion layers 24, 26 is engaged with the first bipolar plate 110A.

The method further includes arranging a second bipolar plate 110B of the plurality of bipolar plates 110 above the first diffusion-electrode assembly 101 such that the other of the two gas diffusion layers 24, 26 is engaged with the second bipolar plate 110B. The second bipolar plate 110B is arranged on the first diffusion-electrode assembly 101 rotated 180 degrees relative to the first bipolar plate 110A about a central axis 129 that extends through a central point 124 of the rectangular plate 110 and that is perpendicular to the plate 110. The second outer seal 135, the second inner seal 155, and the second raised feed channel 184 of the second bipolar plate 110B are aligned with the first outer seal 150, the first inner seal 130, and the first raised feed channel 182, respectively. The membrane frame 103 is located between adjacent raised feed channels 182, 184 such that each of the raised feed channels 182, 184 contacts the membrane frame 103 so as to prevent mechanical deformations of the first and second bipolar plate 110A, 110B.

The method further includes arranging an additional bipolar plate 110C and an additional diffusion-electrode assembly 101 above or below one of the first and second bipolar plates 110A, 110B. The additional bipolar plate 110C is rotated 180 degrees, clockwise or counter clockwise relative to the one of the first and second bipolar plates 110A, 110B. The second outer seal 135, the second inner seal 155, and the second raised feed channel 184 of the additional bipolar plate 110C are aligned with the first outer seal 150, the first inner seal 130, and the first raised feed channel 182 of the one of the first and second bipolar plates 110A, 110B, respectively.

The following described aspects of the present invention are contemplated and non-limiting:

A first aspect of the present invention relates to a fuel cell assembly. The fuel cell assembly comprises a first bipolar plate, a second bipolar plate, and a diffusion-electrode assembly. The first bipolar plate includes a first upper side and a first lower side. The first upper side defines a first top surface and includes a first seal protruding upwardly away from the first top surface and at least one first raised feed channel formed adjacent to the first seal and protruding upwardly away from the first top surface.

Fluid enters the first raised feed channel and subsequently flows along first channels formed in the first bipolar plate. The second bipolar plate includes a second upper side and a second lower side. The second lower side defines a second bottom surface and includes a second seal protruding downwardly away from the second bottom surface and at least one second raised feed channel formed adjacent to the second seal and protruding downwardly away from the second bottom surface. Fluid enters the second raised feed channel and subsequently flows along second channels formed in the second bipolar plate.

The diffusion-electrode assembly is arranged between the first bipolar plate and the second bipolar plate. The diffusion-electrode assembly is in spaced apart relation to the first and second seals and the first and second raised feed channels. The diffusion-electrode assembly includes a membrane electrode layer arranged between a first gas diffusion layer and a second gas diffusion layer each configured to engage with the fluids, respectively.

The membrane electrode layer includes an electrode body and a membrane frame extending away from the electrode body, between the first and second seals and between the first and second raised feed channels. The first bipolar plate and the second bipolar plate are arranged parallel with each other and are aligned such that the first seal and the second seal align with each other, and such that the first raised feed channel and the second raised feed channel align with each other. The first raised feed channel and the second raised feed channel contact the membrane frame arranged therebetween so as to prevent mechanical deformations of the first and second bipolar plate.

A second aspect of the present invention relates to a fuel cell assembly. The fuel cell assembly comprises a plurality of bipolar plates and a diffusion-electrode assembly. The plurality of bipolar plates are generally rectangular and planar, stacked relative to each other, and each include at least one seal arranged on an inlet of the bipolar plate. The at least one seal is in contact with at least one seal of an adjacent bipolar plate.

The diffusion-electrode assembly includes a membrane electrode and two gas diffusion layers surrounding the membrane electrode. The diffusion-electrode assembly is arranged between adjacent bipolar plates of the plurality of bipolar plate. The membrane electrode layer includes an electrode body and a membrane frame extending away from the electrode body. Each bipolar plate of the plurality of bipolar plates further includes a raised feed channel spaced apart from at least one seal of the at least one seal and adjacent to the inlet.

The raised feed channel protrudes away from the bipolar plate in a direction that the at least one seal protrudes away from the bipolar plate. Fluid enters the raised feed channel and subsequently flows along channels formed in the bipolar plate in order to engage with one of the two gas diffusion layers. The plurality of bipolar plates are stacked such that the membrane frame is located between adjacent raised feed channels and such that each of the raised feed channels contacts the membrane frame so as to prevent mechanical deformations of the plurality of bipolar plates.

A third aspect of the present invention relates to a method of forming a fuel cell. The method comprises providing a plurality of bipolar plates that are generally rectangular and planar, each bipolar plate including (i) a first outer seal protruding downwardly away from the plate, a first inner seal protruding upwardly away from the plate, and a first raised feed channel protruding upwardly away from the plate, the first outer seal, the first inner seal, and the first raised feed channel arranged on an inlet of the bipolar plate, and (ii) a second inner seal protruding downwardly away from the plate, a second outer seal protruding upwardly away from the plate, and a second raised feed channel protruding downwardly away from the plate.

The second outer seal, the second inner seal, and the second raised feed channel are arranged on an outlet of the bipolar plate, the inlet being located in a first corner of the plate and the outlet being located in a second corner of the plate diagonally opposite of the first corner. The method further includes providing at least one diffusion-electrode assembly including a membrane electrode and two gas diffusion layers surrounding the membrane electrode. The membrane electrode layer including an electrode body and a membrane frame extending away from the electrode body. The method further includes arranging a first bipolar plate of the plurality of bipolar plates in a first position.

The method further includes arranging a first diffusion-electrode assembly of the at least one diffusion-electrode assembly above the first bipolar plate such that one of the two gas diffusion layers is engaged with the first bipolar plate. The method further includes arranging a second bipolar plate of the plurality of bipolar plates above the first diffusion-electrode assembly such that the other of the two gas diffusion layers is engaged with the second bipolar plate, wherein the second bipolar plate is arranged on the first diffusion-electrode assembly rotated 180 degrees clockwise or counterclockwise relative to the first bipolar plate about a central axis that extends through a central point of the rectangular plate and that is perpendicular to the plate such that the second outer seal, the second inner seal, and the second raised feed channel of the second bipolar plate are aligned with the first outer seal, the first inner seal, and the first raised feed channel of the first bipolar plate, respectively. The membrane frame is located between the first and the second raised feed channels such that the first and the second raised feed channels contact the membrane frame so as to prevent mechanical deformations of the first and second bipolar plate.

In the first aspect of the present invention, the first lower side of the first bipolar plate may define a first lower surface and may include a third seal protruding downwardly away from the first lower surface. In the first aspect of the present invention, the third seal may be in spaced apart relation to the first seal and the first raised feed channel such that the first raised feed channel may be located between the first seal and the third seal in a longitudinal direction of the first bipolar plate. In the first aspect of the present invention, the contact between the first raised feed channel, the second raised feed channel, and the membrane frame may prevent mechanical deformations of the first and second bipolar plates in response to the third seal being acted on by a first external force.

In the first aspect of the present invention, the second upper side of the second bipolar plate may define a second top surface and may include a fourth seal protruding upwardly away from the second top surface. In the first aspect of the present invention, the fourth seal may be in spaced apart relation to the second seal and the second raised feed channel such that the second raised feed channel may be located between the second seal and the fourth seal in a longitudinal direction of the second bipolar plate. In the first aspect of the present invention, the contact between the first raised feed channel, the second raised feed channel, and the membrane frame may prevent mechanical deformations of the first and second bipolar plates in response to the fourth seal being acted on by a second external force.

In the first aspect of the present invention, the first external force may be generated by a third bipolar plate arranged below and compressing the first bipolar plate via a fifth seal of the third bipolar plate. In the first aspect of the present invention, the fifth seal may be aligned with and compressing the third seal of the first bipolar plate.

In the first aspect of the present invention, the second external force may be generated by a fourth bipolar plate arranged above and compressing the second bipolar plate via a sixth seal of the fourth bipolar plate. In the first aspect of the present invention, the sixth seal may be aligned with and compressing the fourth seal of the second bipolar plate.

In the first aspect of the present invention, the first bipolar plate may be a rectangular plate that is generally planar. In the first aspect of the present invention, the first bipolar plate may further include a first inlet header portion located adjacent a first corner of the plate, a first outlet header portion located adjacent a second corner of the plate diagonally opposing the first corner, a first active portion located longitudinally between the first inlet header portion and the first outlet header portion on which the first channels are arranged.

In the first aspect of the present invention, the first channels may include a plurality of cathode channels adjacent to the first gas diffusion layer such that fluid flowing through the cathode channels interacts with the first gas diffusion layer. In the first aspect of the present invention, the first seal and the first raised feed channel may be located within the first inlet header portion of the first bipolar plate such that fluid flows from the first raised feed channel to the plurality of cathode channels and exits via the first outlet header portion.

In the first aspect of the present invention, the second bipolar plate may be a rectangular plate that is generally planar. In the first aspect of the present invention, the second bipolar plate may further include a second inlet header portion located adjacent a first corner of the plate, a second outlet header portion located adjacent a second corner of the plate diagonally opposing the first corner, a second active portion located longitudinally between the second inlet header portion and the second outlet header portion on which the second channels are arranged. In the first aspect of the present invention, the second channels may include a plurality of anode channels adjacent to the second gas diffusion layer such that fluid flowing through the anode channels interacts with the second gas diffusion layer. In the first aspect of the present invention, the second seal and the second raised feed channel may be located within the second inlet header portion of the second bipolar plate such that fluid flows from the second raised feed channel to the plurality of anode channels and exits via the second outlet header portion.

In the first aspect of the present invention, the first raised feed channel, the plurality of cathode channels, and at least one first outlet channel located in the first outlet header portion may be in fluidic communication so as to form a first fluid path of the first bipolar plate. In the first aspect of the present invention, a first central axis that extends transversely across the plate and that is perpendicular to longitudinal edges of the plate may divide the first bipolar plate into a first half portion and a second half portion having equal areas. In the first aspect of the present invention, the first fluid path may be rotationally symmetrical relative to the first central axis.

In the first aspect of the present invention, the second raised feed channel, the plurality of anode channels, and at least one second outlet channel located in the second outlet header portion may be in fluidic communication so as to form a second fluid path of the second bipolar plate. In the first aspect of the present invention, a second central axis that extends transversely across the plate and that is perpendicular to longitudinal edges of the plate may divide the second bipolar plate into a first half portion and a second half portion having equal areas. In the first aspect of the present invention, the second fluid path may be rotationally symmetrical relative to the second central axis.

In the first aspect of the present invention, the plurality of cathode channels may be formed between adjacent elongated cathode channel protrusions that protrude away from the first bipolar plate in a first direction opposite a second direction in which the first raised feed channel protrudes. In the first aspect of the present invention, the plurality of anode channels may be formed between adjacent elongated anode channel protrusions that protrude away from the second bipolar plate in a first direction opposite a second direction in which the second raised feed channel protrudes.

In the first aspect of the present invention, the elongated cathode channel protrusions may protrude away from the first bipolar plate a first distance. In the first aspect of the present invention, the elongated anode channel protrusions may protrude away from the second bipolar plate a second distance. In the first aspect of the present invention, the first distance is may be greater than the second distance.

In the first aspect of the present invention, a third distance that the first and second raised feed channels protrude away from the first and second bipolar plates may be an average of the first distance and the second distance.

In the second aspect of the present invention, the at least one seal of each bipolar plate of the plurality of bipolar plates may include an outer seal and an inner seal. In the second aspect of the present invention, the outer and inner seals may be spaced apart from each other in a longitudinal direction of the plate. In the second aspect of the present invention, the raised feed channel may be located between the outer and inner seals.

In the second aspect of the present invention, the stacked bipolar plates may alternate between first bipolar plates and second bipolar plates. In some embodiments, the outer seal of each first bipolar plate may protrude upwardly away from the bipolar plate. In the second aspect of the present invention, the inner seal and raised feed channel of each first bipolar plate may protrude downwardly away from the bipolar plate.

In the second aspect of the present invention, the outer seal of each second bipolar plate may protrude downwardly away from the bipolar plate. In the second aspect of the present invention, the inner seal and raised feed channel of each second bipolar plate may protrude upwardly away from the bipolar plate. In the second aspect of the present invention, the outer seals, the inner seals, and the raised feed channels of adjacent first and second bipolar plates may be each aligned with each other.

In the second aspect of the present invention, each bipolar plate may include a central active region having elongated channel protrusions that define channels therebetween. In the second aspect of the present invention, the elongated channel protrusions of the first bipolar plates may protrude away from the first bipolar plate a first distance.

In the second aspect of the present invention, the elongated channel protrusions of the second bipolar plate may protrude away from the second bipolar plate a second distance. In the second aspect of the present invention, the first distance may be greater than the second distance. In the second aspect of the present invention, a third distance that the raised feed channels may protrude away from the first and second bipolar plates may be an average of the first distance and the second distance.

In the third aspect of the present invention, the method may further comprise arranging an additional bipolar plate and an additional diffusion-electrode assembly above or below one of the first and second bipolar plates, wherein the additional bipolar plate may be rotated 180 degrees relative to the one of the first and second bipolar plates such that the second outer seal, the second inner seal, and the second raised feed channel of the additional bipolar plate may be aligned with the first outer seal, the first inner seal, and the first raised feed channel of the one of the first and second bipolar plates, respectively.

In the third aspect of the present invention, the first outer seal and the first inner seal may be spaced apart from each other in a longitudinal direction of the plate. In the third aspect of the present invention, the first raised feed channel may be located between the first outer seal and the first inner seal. In the third aspect of the present invention, the second outer seal and the second inner seal may be spaced apart from each other in a longitudinal direction of the plate. In the third aspect of the present invention, the second raised feed channel may be located between the second outer seal and the second inner seal.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed:

1. A fuel cell assembly, comprising:
   a first bipolar plate including a first upper side and a first lower side, the first upper side defines a first top surface and includes a first seal protruding upwardly away from the first top surface and at least one first raised feed channel formed adjacent to the first seal and protruding upwardly away from the first top surface, wherein fluid enters the first raised feed channel and subsequently flows along first channels formed in the first bipolar plate;
   a second bipolar plate including a second upper side and a second lower side, the second lower side defines a second bottom surface and includes a second seal protruding downwardly away from the second bottom surface and at least one second raised feed channel formed adjacent to the second seal and protruding downwardly away from the second bottom surface, wherein fluid enters the second raised feed channel and subsequently flows along second channels formed in the second bipolar plate; and
   a diffusion-electrode assembly arranged between the first bipolar plate and the second bipolar plate and in spaced apart relation to the first and second seals and the first and second raised feed channels, the diffusion-electrode assembly including a membrane electrode layer arranged between a first gas diffusion layer and a second gas diffusion layer each configured to engage with the fluids, respectively, the membrane electrode layer including an electrode body and a membrane frame extending away from the electrode body, between the first and second seals and between the first and second raised feed channels,
   wherein the first bipolar plate and the second bipolar plate are arranged parallel with each other and are aligned such that the first seal and the second seal align with each other, and such that the first raised feed channel and the second raised feed channel align with each other, and
   wherein the first raised feed channel and the second raised feed channel contact the membrane frame arranged therebetween so as to prevent mechanical deformations of the first and second bipolar plate.

2. The fuel cell assembly of claim 1, wherein the first lower side of the first bipolar plate defines a first lower surface and includes a third seal protruding downwardly away from the first lower surface, the third seal being in spaced apart relation to the first seal and the first raised feed channel such that the first raised feed channel is located between the first seal and the third seal in a longitudinal direction of the first bipolar plate, and wherein the contact between the first raised feed channel, the second raised feed channel, and the membrane frame prevents mechanical deformations of the first and second bipolar plates in response to the third seal being acted on by a first external force.

3. The fuel cell assembly of claim 2, wherein the second upper side of the second bipolar plate defines a second top surface and includes a fourth seal protruding upwardly away from the second top surface, the fourth seal being in spaced apart relation to the second seal and the second raised feed channel such that the second raised feed channel is located between the second seal and the fourth seal in a longitudinal direction of the second bipolar plate, and wherein the contact between the first raised feed channel, the second raised feed channel, and the membrane frame prevents mechanical deformations of the first and second bipolar plates in response to the fourth seal being acted on by a second external force.

4. The fuel cell assembly of claim 3, wherein the first external force is generated by a third bipolar plate arranged below and compressing the first bipolar plate via a fifth seal of the third bipolar plate, the fifth seal being aligned with and compressing the third seal of the first bipolar plate.

5. The fuel cell assembly of claim 3, wherein the second external force is generated by a fourth bipolar plate arranged above and compressing the second bipolar plate via a sixth seal of the fourth bipolar plate, the sixth seal being aligned with and compressing the fourth seal of the second bipolar plate.

6. The fuel cell assembly of claim 1, wherein the first bipolar plate is a rectangular plate that is generally planar, wherein the first bipolar plate further includes a first inlet header portion located adjacent a first corner of the plate, a first outlet header portion located adjacent a second corner of the plate diagonally opposing the first corner, a first active portion located longitudinally between the first inlet header portion and the first outlet header portion on which the first channels are arranged, wherein the first channels include a plurality of cathode channels adjacent to the first gas diffusion layer such that fluid flowing through the cathode channels interacts with the first gas diffusion layer, and wherein the first seal and the first raised feed channel are located within the first inlet header portion of the first bipolar plate such that fluid flows from the first raised feed channel to the plurality of cathode channels and exits via the first outlet header portion.

7. The fuel cell assembly of claim 6, wherein the second bipolar plate is a rectangular plate that is generally planar, wherein the second bipolar plate further includes a second inlet header portion located adjacent a first corner of the plate, a second outlet header portion located adjacent a second corner of the plate diagonally opposing the first corner, a second active portion located longitudinally between the second inlet header portion and the second outlet header portion on which the second channels are arranged, wherein the second channels include a plurality of anode channels adjacent to the second gas diffusion layer such that fluid flowing through the anode channels interacts with the second gas diffusion layer, and wherein the second seal and the second raised feed channel are located within the second inlet header portion of the second bipolar plate such that fluid flows from the second raised feed channel to the plurality of anode channels and exits via the second outlet header portion.

8. The fuel cell assembly of claim 7, wherein the first raised feed channel, the plurality of cathode channels, and at least one first outlet channel located in the first outlet header portion are in fluidic communication so as to form a first fluid path of the first bipolar plate, wherein a first central axis that extends transversely across the plate and that is perpendicular to longitudinal edges of the plate divides the first bipolar plate into a first half portion and a second half portion having equal areas, and wherein the first fluid path is rotationally symmetrical relative to the first central axis.

9. The fuel cell assembly of claim 8, wherein the second raised feed channel, the plurality of anode channels, and at least one second outlet channel located in the second outlet header portion are in fluidic communication so as to form a second fluid path of the second bipolar plate, wherein a second central axis that extends transversely across the plate and that is perpendicular to longitudinal edges of the plate divides the second bipolar plate into a first half portion and a second half portion having equal areas, and wherein the second fluid path is rotationally symmetrical relative to the second central axis.

10. The fuel cell assembly of claim 8, wherein the plurality of cathode channels are formed between adjacent elongated cathode channel protrusions that protrude away from the first bipolar plate in a first direction opposite a second direction in which the first raised feed channel protrudes, and wherein the plurality of anode channels are formed between adjacent elongated anode channel protrusions that protrude away from the second bipolar plate in a first direction opposite a second direction in which the second raised feed channel protrudes.

11. The fuel cell assembly of claim 10, wherein the elongated cathode channel protrusions protrude away from the first bipolar plate a first distance, wherein the elongated anode channel protrusions protrude away from the second bipolar plate a second distance, and wherein the first distance is greater than the second distance.

12. The fuel cell assembly of claim 11, wherein a third distance that the first and second raised feed channels protrude away from the first and second bipolar plates is an average of the first distance and the second distance.

13. A fuel cell assembly comprising:
a plurality of bipolar plates that are generally rectangular and planar, stacked relative to each other, and each including at least one seal arranged on an inlet of the bipolar plate, the at least one seal being in contact with at least one seal of an adjacent bipolar plate; and
a diffusion-electrode assembly including a membrane electrode and two gas diffusion layers surrounding the membrane electrode, the diffusion-electrode assembly arranged between adjacent bipolar plates of the plurality of bipolar plates, the membrane electrode including an electrode body and a membrane frame extending away from the electrode body,
wherein each bipolar plate of the plurality of bipolar plates further includes a raised feed channel spaced apart from at least one seal of the at least one seal and adjacent to the inlet, the raised feed channel protruding away from the bipolar plate in a direction that the at least one seal protrudes away from the bipolar plate, wherein fluid enters the raised feed channel and subsequently flows along channels formed in the bipolar plate in order to engage with one of the two gas diffusion layers, and
wherein the plurality of bipolar plates are stacked such that the membrane frame is located between adjacent raised feed channels and such that each of the raised feed channels contacts the membrane frame so as to prevent mechanical deformations of the plurality of bipolar plates.

14. The fuel cell assembly of claim 13, wherein the at least one seal of each bipolar plate of the plurality of bipolar plates includes an outer seal and an inner seal, wherein the outer and inner seals are spaced apart from each other in a longitudinal direction of the plate, and wherein the raised feed channel is located between the outer and inner seals.

15. The fuel cell assembly of claim 14, wherein the stacked bipolar plates alternate between first bipolar plates and second bipolar plates, wherein the outer seal of each first bipolar plate protrudes upwardly away from the bipolar plate, wherein the inner seal and raised feed channel of each first bipolar plate protrudes downwardly away from the bipolar plate, wherein the outer seal of each second bipolar plate protrudes downwardly away from the bipolar plate, and wherein the inner seal and raised feed channel of each second bipolar plate protrudes upwardly away from the bipolar plate, the outer seals, the inner seals, and the raised feed channels of adjacent first and second bipolar plates are each aligned with each other.

16. The fuel cell assembly of claim 15, wherein each bipolar plate includes a central active region having elongated channel protrusions that define channels therebetween, wherein the elongated channel protrusions of the first bipolar plates protrude away from the first bipolar plate a first distance, wherein the elongated channel protrusions of the second bipolar plate protrude away from the second bipolar plate a second distance, and wherein the first distance is greater than the second distance.

17. The fuel cell assembly of claim 16, wherein a third distance that the raised feed channels protrude away from the first and second bipolar plates is an average of the first distance and the second distance.

18. A method of forming a fuel cell, comprising:
providing a plurality of bipolar plates that are generally rectangular and planar, each bipolar plate including (i) a first outer seal protruding downwardly away from the plate, a first inner seal protruding upwardly away from the plate, and a first raised feed channel protruding upwardly away from the plate, the first outer seal, the first inner seal, and the first raised feed channel arranged on an inlet of the bipolar plate, and (ii) a second inner seal protruding downwardly away from the plate, a second outer seal protruding upwardly away from the plate, and a second raised feed channel protruding downwardly away from the plate, the second outer seal, the second inner seal, and the second raised feed channel arranged on an outlet of the bipolar plate, the inlet being located in a first corner of the plate and the outlet being located in a second corner of the plate diagonally opposite of the first corner;

providing at least one diffusion-electrode assembly including a membrane electrode and two gas diffusion layers surrounding the membrane electrode, the membrane electrode including an electrode body and a membrane frame extending away from the electrode body;

arranging a first bipolar plate of the plurality of bipolar plates in a first position;

arranging a first diffusion-electrode assembly of the at least one diffusion-electrode assembly above the first bipolar plate such that one of the two gas diffusion layers is engaged with the first bipolar plate;

arranging a second bipolar plate of the plurality of bipolar plates above the first diffusion-electrode assembly such that the other of the two gas diffusion layers is engaged with the second bipolar plate, wherein the second bipolar plate is arranged on the first diffusion-electrode assembly rotated 180 degrees clockwise or counterclockwise relative to the first bipolar plate about a central axis that extends through a central point of the rectangular plate and that is perpendicular to the plate such that the second outer seal, the second inner seal, and the second raised feed channel of the second bipolar plate are aligned with the first outer seal, the first inner seal, and the first raised feed channel of the first bipolar plate, respectively, wherein the membrane frame is located between the first and the second raised feed channels such that the first and the second raised feed channels contact the membrane frame so as to prevent mechanical deformations of the first and second bipolar plate.

19. The method of claim 18, further comprising:

arranging an additional bipolar plate and an additional diffusion-electrode assembly above or below one of the first and second bipolar plates, wherein the additional bipolar plate is rotated 180 degrees relative to the one of the first and second bipolar plates such that the second outer seal, the second inner seal, and the second raised feed channel of the additional bipolar plate are aligned with the first outer seal, the first inner seal, and the first raised feed channel of the one of the first and second bipolar plates, respectively.

20. The method of claim 19, wherein the first outer seal and the first inner seal are spaced apart from each other in a longitudinal direction of the plate, wherein the first raised feed channel is located between the first outer seal and the first inner seal, wherein the second outer seal and the second inner seal are spaced apart from each other in a longitudinal direction of the plate, and wherein the second raised feed channel is located between the second outer seal and the second inner seal.

* * * * *